United States Patent
Sato et al.

(10) Patent No.: US 10,504,381 B2
(45) Date of Patent: Dec. 10, 2019

(54) ON-RUNNING LANDING POSITION EVALUATION METHOD, ON-RUNNING LANDING POSITION EVALUATION APPARATUS, DETECTION METHOD, DETECTION APPARATUS, RUNNING MOTION EVALUATION METHOD, AND RUNNING MOTION EVALUATION APPARATUS

(71) Applicant: Seiko Epson Corporation, Shinjuku-ku (JP)

(72) Inventors: Akinobu Sato, Fujimi-machi (JP); Shuji Uchida, Shiojiri (JP); Daisuke Sugiya, Chino (JP)

(73) Assignee: Seiko Epson Corporation, Tokyo (JP)

( * ) Notice: Subject to any disclaimer, the term of this patent is extended or adjusted under 35 U.S.C. 154(b) by 370 days.

(21) Appl. No.: 14/814,506

(22) Filed: Jul. 30, 2015

(65) Prior Publication Data

US 2016/0030823 A1 Feb. 4, 2016

(30) Foreign Application Priority Data

| Jul. 31, 2014 | (JP) | 2014-155883 |
| Jul. 31, 2014 | (JP) | 2014-155884 |
| Jul. 31, 2014 | (JP) | 2014-156116 |
| Jun. 5, 2015 | (JP) | 2015-115210 |

(51) Int. Cl.
*G09B 19/00* (2006.01)
*G06K 9/00* (2006.01)

(52) U.S. Cl.
CPC ..... *G09B 19/0038* (2013.01); *G06K 9/00342* (2013.01)

(58) Field of Classification Search
CPC .................................................. G09B 19/0038
See application file for complete search history.

(56) References Cited

U.S. PATENT DOCUMENTS

| 6,164,416 A | * | 12/2000 | Laine | ........................ B66B 1/30 |
| | | | | 187/284 |
| 6,226,591 B1 | * | 5/2001 | Okumura | ............... G01C 21/28 |
| | | | | 701/409 |

(Continued)

FOREIGN PATENT DOCUMENTS

| JP | 2007-125368 A | 5/2007 |
| JP | 2013-106773 A | 6/2013 |

(Continued)

OTHER PUBLICATIONS

Lieberman, Daniel E., et al., "Foot strike patterns and collision forces in habitually barefoot versus shod runners," Nature, vol. 463, pp. 531-535, (Jan. 28, 2010), Macmillan Publishers Limited.

(Continued)

*Primary Examiner* — Manuel L Barbee
*Assistant Examiner* — Raymond L Nimox
(74) *Attorney, Agent, or Firm* — Kilpatrick Townsend & Stockton LLP

(57) ABSTRACT

An on-running landing position evaluation method includes determining a deceleration period in an on-ground duration of a user who is running based on an acceleration value and calculating a travel distance in the determined deceleration period.

5 Claims, 26 Drawing Sheets

(56) References Cited

U.S. PATENT DOCUMENTS

| | | | |
|---|---|---|---|
| 8,676,484 B2* | 3/2014 | Onogi | B60L 11/1861 |
| | | | 320/109 |
| 9,227,108 B1* | 1/2016 | Chuang | G09B 19/0038 |
| 9,470,705 B2* | 10/2016 | Statham | G01P 3/00 |
| 9,747,572 B2* | 8/2017 | Watanabe | G06Q 10/0639 |
| 2007/0073514 A1 | 3/2007 | Nogimori et al. | |
| 2009/0299594 A1* | 12/2009 | Harumoto | B60W 50/0098 |
| | | | 701/70 |
| 2010/0017028 A1* | 1/2010 | Suga | B62D 57/032 |
| | | | 700/245 |
| 2010/0331145 A1 | 12/2010 | Lakovic et al. | |
| 2013/0041617 A1 | 2/2013 | Pease et al. | |
| 2013/0190657 A1 | 7/2013 | Flaction et al. | |
| 2013/0190658 A1 | 7/2013 | Flaction et al. | |
| 2013/0238163 A1* | 9/2013 | Onogi | B60Q 9/00 |
| | | | 701/1 |
| 2014/0073481 A1* | 3/2014 | Aibara | G02B 27/017 |
| | | | 482/1 |
| 2014/0288681 A1* | 9/2014 | Watanabe | A61B 5/6828 |
| | | | 700/91 |
| 2015/0151755 A1* | 6/2015 | Ohmori | B60T 7/22 |
| | | | 701/93 |
| 2016/0213975 A1 | 7/2016 | Flaction et al. | |
| 2018/0133548 A1 | 5/2018 | Flaction et al. | |

FOREIGN PATENT DOCUMENTS

| | | |
|---|---|---|
| JP | 2013-140158 A | 7/2013 |
| JP | 2013-537436 A | 10/2013 |
| JP | 2014-504943 A | 2/2014 |
| JP | 2014-054303 A | 3/2014 |

OTHER PUBLICATIONS

"Difference in running form due to pelvic forward and backward tilt," Practice Diary; Athletics; Website: https://blogs.yahoo.co./jp/qfqfh345/31867079.html, Runner Manipulator's Monologue, Yahoo Japan, (Jan. 22, 2012).

* cited by examiner (1)

(2)

[LANDING POSITION EVALUATION DATA]
350

| MEASUREMENT NUMBER | LANDING TIMING | STANDING INTERMEDIATE POINT TIMING | LENGTH OF PERIOD ΔT | SPEED V | TRAVEL DISTANCE L |
|---|---|---|---|---|---|
| 1 | t11 | t12 | ΔT1 | V1 | L1 |
| 2 | t21 | t22 | ΔT2 | V2 | L2 |
| 3 | t31 | t32 | ΔT3 | V3 | L3 |
| ... | ... | ... | ... | ... | ... |

FIG. 7

| LANDING TIMING | TAKEOFF TIMING | EVALUATION INDEX VALUE | | |
|---|---|---|---|---|
| | | ON-GROUND DURATION | IN-AIR DURATION | ON-GROUND-TO-IN-AIR DURATION RATIO |
| Ta1 | Tb1 | Tc1 | Td1 | Td1/Tc1 |
| Ta2 | Tb2 | Tc2 | Td2 | Td2/Tc2 |
| Ta3 | Tb3 | Tc3 | Td3 | Td3/Tc3 |
| ⋮ | ⋮ | ⋮ | ⋮ | ⋮ |

| SIDE-VIEW POSITION (X, Y) | RUNNING DATA | | PROPULSION EFFICIENCY ANGLE |
|---|---|---|---|
| | RUNNING SPEED | RUNNING DISTANCE | |
| ⋮ | ⋮ | ⋮ | ⋮ |
| $(X_{100}, Y_{100})$ | $V_{100}$ | $L_{100}$ | — |
| $(X_{101}, Y_{101})$ | $V_{101}$ | $L_{101}$ | — |
| $(X_{102}, Y_{102})$ | $V_{102}$ | $L_{102}$ | $\theta_{102}$ |
| $(X_{103}, Y_{103})$ | $V_{103}$ | $L_{103}$ | — |
| ⋮ | ⋮ | ⋮ | ⋮ |

FIG. 23

ON-RUNNING LANDING POSITION EVALUATION METHOD, ON-RUNNING LANDING POSITION EVALUATION APPARATUS, DETECTION METHOD, DETECTION APPARATUS, RUNNING MOTION EVALUATION METHOD, AND RUNNING MOTION EVALUATION APPARATUS

BACKGROUND

1. Technical Field

The present invention relates to an on-running landing position evaluation method and the like. The invention further relates to a detection method for detecting user's landing and takeoff and the like. The invention further relates to a running motion evaluation method for evaluating the user's running motion and the like.

2. Related Art

A portable electronic apparatus attached to a body portion or an arm of a user who does a sport, such as running, is widely used. Some popular portable electronic apparatus of this type having been developed have a variety of built-in sensors, such as an acceleration sensor and a gyro sensor, and have a function of calculating a variety of data of the sport, such as the position, the running speed, the heart rate, the number of footsteps, and the running pace by using detection values from the built-in sensors (see JP-A-2013-140158, for example).

Further, there is a known portable apparatus of related art that is attached to a user who is running and periodically measures and displays information on the user's position and speed, information on travel distance, and other types of information.

Still further, there is a technology for displaying motion images of a virtual runner on a display section of display glasses that the user wears around the head in order to allow the virtual runner to contribute to achievement of a good record (see JP-A-2014-054303, for example).

To work on running in an attempt to achieve a good record, only being aware of the running speed is insufficient, and it is important to be aware of the state of body motion, such as a running form. The reason for this is that when a person runs in a good form, not only can it be expected that the person achieves a good record, but also the person can run for a long period with fatigue accumulation and risks of injury and other types of failure lowered. A known example of a technology for analyzing a running form by using an apparatus attached to a user who is running is the technology described in JP-A-2013-106773.

Further, one of indices for evaluation of the motion state is, for example, an on-ground duration. It is believed that a long in-air duration achieves a long stride and results in a short on-ground duration for improvement in running speed. In addition, a short on-ground duration can reduce a burden acting on the legs during running motion. It is therefore meaningful for a runner to know an index relating to the on-ground duration (hereinafter referred to as "evaluation index value") because the knowledge leads to being aware of the state of the runner's motion.

However, in addition to recording daily running exercise, it is convenient and desired to have a kind of coaching function of evaluating running itself, such as the running form, and notifying a user of an evaluation result. For example, a landing position in running motion is one running evaluation index, and it is believed desirable that a runner lands on the ground in a position roughly immediately below the center of gravity of the runner (landing immediately below). The reason for this is that landing on the ground in a forward position from the center of gravity causes braking force to act on the runner, whereas landing on the ground in a position roughly immediately below the center of gravity reduces the braking force resulting from reaction from the ground. The landing immediately below provides another advantage of a decrease in the amount of upward-downward movement of the center of gravity. All things described above considered, the landing immediately below is believed to achieve energy-efficient running.

Methods of related art for evaluating the landing position in running motion, for example, use motion capture, video image capture, and a floor reaction force meter. Each of the methods of related art, however, needs to install a large-scale system and requires a user to run a route where the system is installed. The location where the user can actually run is therefore limited, and it is substantially impossible to continuously evaluate running over a long distance for a long period. A typical runner is undesirably not allowed to make casual use of any of these methods.

Further, to calculate the on-ground duration, it is necessary to detect the timing when a leg lands on the ground and the timing when the leg takes off the ground. No specific technology for precisely detecting the landing timing and the takeoff timing with a sensor attached to a user has been known.

Another index for evaluation of the motion state is propulsion efficiency. The propulsion efficiency represents how long a runner has traveled forward in response to applied force, more specifically, how efficiently the runner converts reaction force from the ground in an on-ground duration into propulsion that moves the runner' body in the advance direction. It can therefore be said that reduction in body movement in directions other than the advance direction allows efficient propulsion generation, and that reduction in upward/downward movement due to jump at the time of takeoff and subduction at the time of landing and reduction in rightward/leftward runout allow improvement in the propulsion efficiency. In particular, the movement in the upward/downward direction, which coincides with the direction of gravity, greatly affects the propulsion efficiency.

JP-A-2013-106773, for example, focuses on the point described above and describes analysis of a running form from a viewpoint of smallness of the upward/downward movement and diagnosis of body action. It is, however, actually difficult in some cases to evaluate the quality of the propulsion efficiency only from the upward/downward movement.

SUMMARY

An advantage of some aspects of the invention is to provide a technology that allows a portable electronic apparatus attached to and used by a user to evaluate the landing position in the running motion.

Another advantage of some aspects of the invention is to provide a technology for precisely detecting the user's landing timing and takeoff timing.

Still another advantage of some aspects of the invention is to provide a new index that reflects propulsion efficiency.

Application Example 1

An on-running landing position evaluation method according to this application example includes determining a deceleration period in an on-ground duration of a user who is running based on an acceleration value and calculating a travel distance in the determined deceleration period.

The on-running landing position evaluation method according to this application example allows evaluation of a landing position of a user who is running by using an acceleration value. No large-scale system needs to be provided. Specifically, a deceleration period in an on-ground duration of the user who is running is determined based on an acceleration value, and the travel distance in the deceleration period is calculated for evaluation of the landing position in the running motion. For example, a detection value from an acceleration sensor attached to the user may be used to determine the deceleration period in the on-ground duration of the user. The acceleration sensor may be attached to the user's body portion, that is, in a position close to the center of gravity of the user. The travel distance in the deceleration period corresponds to the distance between the landing position at the timing when the user lands on the ground and the center of gravity of the user. The travel distance in the deceleration period can therefore be calculated, for example, by using a detection value from the acceleration sensor attached to the user. Since a shorter travel distance in the deceleration period means that the user has landed on the ground in a position closer to the position immediately below the center of gravity, the landing position can be evaluated.

Application Example 2

In the on-running landing position evaluation method according to the application example described above, determining the deceleration period may include determining landing timing and standing intermediate point timing.

The on-running landing position evaluation method according to this application example allows determination of the deceleration period by determining the landing timing that is the timing when the deceleration period starts and the standing intermediate point timing that is the timing when the deceleration period ends.

Application Example 3

In the on-running landing position evaluation method according to the application example described above, determining the standing intermediate point timing may include determining the standing intermediate point timing by using the acceleration value in a vertical direction.

The on-running landing position evaluation method according to this application example allows determination of the standing intermediate point timing by using the acceleration value in the vertical direction.

Application Example 4

In the on-running landing position evaluation method according to the application example described above, calculating the travel distance may include multiplying the length of the deceleration period by the user's travel speed to calculate the travel distance.

The on-running landing position evaluation method according to this application example allows calculation of the travel distance in the deceleration period by multiplying the length of the deceleration period by the user's travel distance. The length of the deceleration period and the travel speed can be calculated by using the acceleration value.

Application Example 5

The on-running landing position evaluation method according to the application example described above may include detecting the positions of the landing timing and the standing intermediate point timing and calculating the travel distance based on the positions of the landing timing and the standing intermediate point timing.

The on-running landing position evaluation method according to this application example allows detection of the positions of the landing timing and the standing intermediate point timing and calculation of the travel distance in the deceleration period based on the detected positions.

Application Example 6

The on-running landing position evaluation method according to the application example described above may further include performing notification according to the travel distance.

The on-running landing position evaluation method according to this application example allows notification according to the calculated travel distance in the deceleration period. The user can make use of the notification for the user's own running motion.

Application Example 7

In the on-running landing position evaluation method according to the application example described above, performing the notification may include displaying the travel distance calculated in the past and the travel distance newly calculated with the travel distances distinguished from each other.

The on-running landing position evaluation method according to this application example allows display of the travel distance calculated in the past and the travel distance newly calculated with the two types of travel distance distinguished from each other. The travel distance used herein is the travel distance in the deceleration period. Since the user who is running can thus update the travel distance in the deceleration period and display the latest travel distance in a realtime manner, the user can compare the latest travel distance with the travel distance in the past.

Application Example 8

An on-running landing position evaluation apparatus according to this application example includes a determination section that determines a deceleration period in an on-ground duration of a user who is running based on an acceleration value and a calculation section that calculates a travel distance in the determined deceleration period.

The on-running landing position evaluation apparatus according to this application example allows evaluation of a landing position of a user who is running by using an acceleration value. No large-scale system needs to be provided. Specifically, a deceleration period in an on-ground duration of the user who is running is determined based on an acceleration value, and the travel distance in the deceleration period is calculated for evaluation of the landing position in the running motion. For example, a detection value from an acceleration sensor attached to the user may be used to determine the deceleration period in the on-ground duration of the user. The acceleration sensor may be attached to the user's body portion, that is, in a position close to the center of gravity of the user. The travel distance in the deceleration period corresponds to the distance between the landing position at the timing when the user lands on the ground and the center of gravity of the user. The travel distance in the deceleration period can therefore be calculated, for example, by using a detection value from the acceleration sensor attached to the user. Since a shorter travel distance in the deceleration period means that the user has landed on the ground in a position closer to the position immediately below the center of gravity, the landing position can be evaluated.

Application Example 9

A detection method according to this application example includes acquiring advance acceleration of a user who is running and detecting landing timing based on the advance acceleration.

The detection method according to this application example allows detection of the landing timing based on the advance acceleration of the user who is running. The user's landing timing can therefore be detected with precision.

Application Example 10

In the detection method according to the application example described above, the detecting may include detecting the landing timing based on a change in the advance acceleration.

The detection method according to this application example allows detection of the landing timing based on a change in the advance acceleration.

Application Example 11

In the detection method according to the application example described above, detecting the landing timing may include detecting a local maximum of the change in the advance acceleration immediately before a first local minimum of the change in the advance acceleration to detect the landing timing.

The detection method according to this application example allows detection of the landing timing in the form of the timing when a local maximum of the change in the advance acceleration occurs immediately before a first local minimum thereof.

Application Example 12

The detection method according to the application example described above may include acquiring upward/downward acceleration of the user who is running and detecting takeoff timing based on at least one of the advance acceleration and the upward/downward acceleration.

The detection method according to this application example allows detection of the landing timing and the takeoff timing based on the advance acceleration and the upward/downward acceleration of the user. The takeoff timing and the landing timing of the user can therefore be detected with precision.

Application Example 13

In the detection method according to the application example described above, the detecting may include first takeoff timing detection in which the takeoff timing is detected by detecting a local minimum of a change in the advance acceleration immediately after the advance acceleration becomes smaller than the upward/downward acceleration.

The detection method according to this application example allows the first takeoff timing detection, in which the takeoff timing is detected based on a change in the advance acceleration and a change in the upward/downward acceleration, to be performed to detect the takeoff timing in the form of the timing when the advance acceleration is locally minimized immediately after it becomes smaller than the upward/downward acceleration.

Application Example 14

In the detection method according to the application example described above, the detecting may include second takeoff timing detection in which the takeoff timing is detected by detecting that the upward/downward acceleration becomes greater than or equal to a predetermined value.

The detection method according to this application example allows detection of the takeoff timing in the form of the timing when the upward/downward acceleration becomes greater than or equal to a predetermined value.

Application Example 15

In the detection method according to the application example described above, detecting the takeoff timing may include deciding the takeoff timing by using one of a detection result provided by the first takeoff timing detection and a detection result provided by the second takeoff timing detection in accordance with the user's travel speed.

The advance acceleration and the upward/downward acceleration change differently from each other when the user takes off the ground depending on the user's travel speed. The detection method according to this application example allows decision of the takeoff timing by using one of a detection result provided by the first takeoff timing detection and a detection result provided by the second takeoff timing detection in accordance with the user's travel speed.

Application Example 16

The detection method according to the application example described above may include controlling a display section to display at least one of an on-ground duration from the landing timing to the takeoff timing and an in-air duration from the takeoff timing to the landing timing.

The detection method according to this application example allows calculation of at least one of the on-ground duration from the landing timing to the takeoff timing and the in-air duration from the takeoff timing to the landing timing based on the detected landing timing and takeoff timing and display of the calculated duration in the display section.

Application Example 17

A detection apparatus according to this application example includes an acquisition section that acquires advance acceleration of a user who is running and a detection section that detects landing timing based on the advance acceleration.

The detection apparatus according to this application example allows detection of the landing timing based on the advance acceleration of the user who is running. The landing timing of the user can therefore be detected with precision.

Application Example 18

A running motion evaluation method according to this application example includes determining motion course information representing then position in an upward/downward direction with respect to an advance direction of a user in running motion in a side view, detecting advance acceleration that is acceleration in the advance direction of the user, and calculating a propulsion efficiency index value representing the orientation of propulsion with respect to the advance direction by using the motion course information and the advance acceleration.

The running motion evaluation method according to this application example allows calculation of the propulsion efficiency index value, which represents the orientation of the propulsion with respect to the advance direction, by using the motion course information representing the position in the upward/downward direction with respect to the advance direction of the user in running motion in a side view and the acceleration in the advance direction of the user.

Application Example 19

In the running motion evaluation method according to the application example described above, the calculating may include determining landing timing by using the motion course information, calculating an advance travel distance and an upward/downward amplitude between front and behind landing positions by using the motion course information, and calculating the propulsion efficiency index value by using the travel distance and the amplitude.

The running motion evaluation method according to this application example allows determination of the landing timing and calculation of the propulsion efficiency index value by using the advance travel distance and the upward/downward amplitude between front and behind landing positions.

Application Example 20

In the running motion evaluation method according to the application example described above, the calculating may include determining landing timing and highest point reaching timing immediately before the landing timing by using the motion course information, calculating an advance travel distance and an upward/downward travel distance between the landing timing and the highest point reaching timing by using the motion course information, and calculating the propulsion efficiency index value by using the advance travel distance and the upward/downward travel distance.

The running motion evaluation method according to this application example allows determination of the landing timing and the highest point reaching timing immediately before the landing timing and calculation of the propulsion efficiency index value by using the advance travel distance and the upward/downward travel distance in the range between the landing timing and the highest point reaching timing.

Application Example 21

In the running motion evaluation method according to the application example described above, the calculating may include determining lowest point reaching timing and highest point reaching timing immediately after the lowest point reaching timing by using the motion course information, calculating an advance travel distance and an upward/downward travel distance between the lowest point reaching timing and the highest point reaching timing by using the motion course information, and calculating the propulsion efficiency index value by using the advance travel distance and the upward/downward travel distance.

The running motion evaluation method according to this application example allows determination of the lowest point reaching timing and the highest point reaching timing immediately after the lowest point reaching timing and calculation of the propulsion efficiency index value by using the advance travel distance and the upward/downward travel distance in the range between the lowest point reaching timing and the highest point reaching timing.

Application Example 22

In the running motion evaluation method according to the application example described above, the calculating may include determining an inflection point of a trajectory between a lowest point and a highest point based on information on the position of the user in a side view, calculating a tangential direction of the trajectory at the inflection point, and calculating the propulsion efficiency index value by using the tangential direction.

The running motion evaluation method according to this application example allows determination of an inflection point based on the trajectory between the lowest point and the highest point and calculation of the propulsion efficiency index value by using the tangential direction at the inflection point.

Application Example 23

In the running motion evaluation method according to the application example described above, the calculating may include determining takeoff timing by using the motion course information and calculating the propulsion efficiency index value in the form of the orientation of propulsion with respect to the advance direction at the takeoff timing.

The running motion evaluation method according to this application example allows calculation of the propulsion efficiency index value in the form of the orientation of the propulsion relative to the advance direction at the takeoff timing.

Application Example 24

A running motion evaluation apparatus according to this application example includes a detection section that determines motion course information representing an upward/downward position of a user in running motion in a side view with respect to an advance direction of the user and further determines advance acceleration that is acceleration in the advance direction of the user and a calculation section that calculates a propulsion efficiency index value representing the orientation of propulsion with respect to the advance direction by using the motion course information and the advance acceleration.

The running motion evaluation apparatus according to this application example allows calculation of the propulsion efficiency index value, which represents the orientation of the propulsion with respect to the advance direction, by using the motion course information representing the upward/downward position of the user in running motion in a side view with respect to the advance direction of the user and the advance acceleration of the user.

BRIEF DESCRIPTION OF THE DRAWINGS

The invention will be described with reference to the accompanying drawings, wherein like numbers reference like elements.

FIG. 7 shows an example of the data configuration of landing position evaluation data.

FIG. 11 shows an example of the data configuration of landing/takeoff data in the first example of the second embodiment.

FIG. 23 shows an example of the data configuration of running information.

DESCRIPTION OF EXEMPLARY EMBODIMENTS

Figure 1:
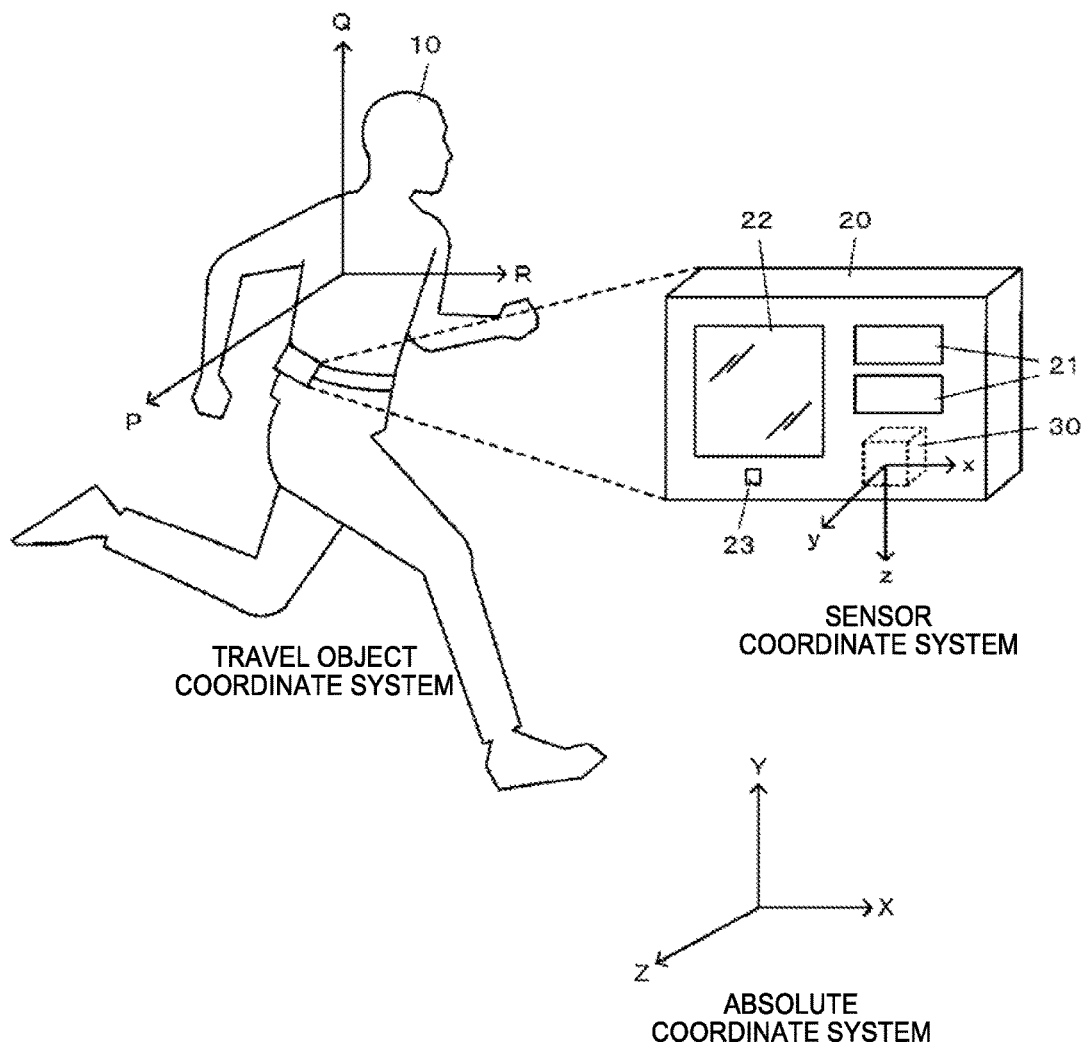
FIG. 1 shows an example of the configuration of a portable electronic apparatus in a first embodiment.

An on-running landing position evaluation method according to an embodiment of the invention includes determining a deceleration period in an on-ground duration of a user based on a detection value from an acceleration sensor attached to the user and calculating the travel distance in the determined deceleration period.

An on-running landing position evaluation apparatus including the following components may be configured as another embodiment: a determination section that determines a deceleration period in an on-ground duration of a user who is running by using a detection value from an acceleration sensor attached to the user and a calculation section that calculates the travel distance in the determined deceleration period.

The on-running landing position evaluation method and the like according to the present embodiment allow evaluation of the landing position of the user who is running by using a detection value from an acceleration sensor attached to the user. No large-scale system needs to be provided. Specifically, the deceleration period in the on-ground duration of the user is determined by using a detection value from the acceleration sensor, and the travel distance in the deceleration period is calculated for evaluation of the landing position in the running motion. The acceleration sensor is attached to the user's body portion, that is, in a position close to the center of gravity of the user. The travel distance in the deceleration period corresponds to the distance between the landing position at the timing when the user lands on the ground and the position of the center of gravity of the user. The travel distance in the deceleration period can therefore be calculated by using a detection value from the acceleration sensor attached to the user. Since a shorter travel distance in the deceleration period means that the user has landed on the ground in a position closer to the position immediately below the center of gravity, the landing position can be evaluated.

In the on-running landing position evaluation method according to the embodiment described above, determining the deceleration period may include determining landing timing and standing intermediate point timing.

The on-running landing position evaluation method according to the present embodiment allows determination of the deceleration period by determining the landing timing, which is the timing when the deceleration period starts, and the standing intermediate point timing, which is the timing when the deceleration period ends.

In the on-running landing position evaluation method according to the embodiment described above, determining the standing intermediate point timing may include determining the standing intermediate point timing by using the detection value in the vertical direction.

The on-running landing position evaluation method according to the embodiment allows determination of the standing intermediate point timing by using a detection value in the vertical direction from the acceleration sensor.

In the on-running landing position evaluation method according to the embodiment described above, calculating the travel distance may include multiplying the length of the deceleration period by the user's travel speed to calculate the travel distance.

The on-running landing position evaluation method according to the present embodiment allows calculation of the travel distance in the deceleration period by multiplying the length of the deceleration period by the user's travel speed. The length of the deceleration period and the travel speed can be calculated by using a detection value from the acceleration sensor.

The on-running landing position evaluation method according to the embodiment described above may include detecting the positions of the landing timing and the standing intermediate point timing and calculating the travel distance based on the positions of the landing timing and the standing middle period timing.

The on-running landing position evaluation method according to the present embodiment allows detection of the positions of the landing timing and the standing intermediate point timing and calculation of the travel distance in the deceleration period from the detected positions.

The on-running landing position evaluation method according to the embodiment described above may further include performing notification according to the travel distance.

The on-running landing position evaluation method according to the present embodiment allows notification according to the calculated travel distance in the deceleration period. The user can therefore make use of the notification for the user's own running motion.

More specifically, in the on-running landing position evaluation method according to the embodiment described above, performing notification may include displaying the travel distance calculated in the past and the travel distance newly calculated with the two types of travel distance distinguished from each other.

The on-running landing position evaluation method according to the present embodiment allows display of the travel distance calculated in the past and the travel distance newly calculated with the two types of travel distance distinguished from each other. The travel distance used herein is the travel distance in the deceleration period. Since the user who is running can thus update the travel distance in the deceleration period and display the latest travel distance in a realtime manner, the user can compare the latest travel distance with the past travel distance.

A detection method according to the present embodiment includes acquiring advance acceleration and upward/downward acceleration based on a detection result from the acceleration sensor attached to a user's body portion and detecting landing timing and takeoff timing based on the advance acceleration and upward/downward acceleration.

A detection apparatus including the following components may be configured as another embodiment: an acquisition section that acquires advance acceleration and upward/downward acceleration based on a detection result from an acceleration sensor attached to a user's body portion and a detection section that detects landing timing and takeoff timing based on the advance acceleration and upward/downward acceleration.

The detection method and the like according to the present embodiment allow detection of the landing timing and the takeoff timing based on the advance acceleration and the upward/downward acceleration acquired based on a detection result from the acceleration sensor attached to the user's body portion. The user can thus detect the user's landing timing and takeoff timing with precision.

In the detection method according to the embodiment described above, the detecting may include detecting the landing timing based on a change in the advance acceleration.

The detection method according to the present embodiment allows detection of the landing timing based on a change in the advance acceleration.

In the detection method according to the embodiment described above, detecting the landing timing may include detecting a local maximum of the change in the advance acceleration immediately before a first local minimum of the change in the advance acceleration to detect the landing timing.

The detection method according to the present embodiment allows detection of the landing timing in the form of timing when a local maximum of the change in the advance acceleration occurs immediately before a first local minimum thereof.

In the detection method according to the embodiment described above, the detecting may include first takeoff timing detection in which the takeoff timing is detected by detecting a local minimum of the change in the advance acceleration immediately after the advance acceleration becomes smaller than the upward/downward acceleration.

The detection method according to the present embodiment allows the first takeoff timing detection, in which the takeoff timing is detected based on a change in the advance acceleration and a change in the upward/downward acceleration, to be performed to detect the takeoff timing in the form of timing when the advance acceleration is locally minimized immediately after it becomes smaller than the upward/downward acceleration.

In the detection method according to the embodiment described above, the detecting may include second takeoff timing detection in which the takeoff timing is detected by detecting that the upward/downward acceleration becomes greater than or equal to a predetermined value.

The detection method according to the present embodiment allows detection of the takeoff timing in the form of timing when the upward/downward acceleration becomes greater than or equal to a predetermined value.

In the detection method according to the embodiment described above, detecting the takeoff timing may include deciding the takeoff timing by using one of a detection result provided by the first takeoff timing detection and a detection result provided by the second takeoff timing detection in accordance with the user's travel speed.

The advance acceleration and the upward/downward acceleration change differently from each other when the user takes off the ground depending on the user's travel speed. The detection method according to the present embodiment allows decision of the takeoff timing by using one of a detection result provided by the first takeoff timing detection and a detection result provided by the second takeoff timing detection in accordance with the user's travel speed.

The detection method according to the embodiment described above may include controlling a display section to display at least one of an on-ground duration from the landing timing to the takeoff timing and an in-air duration from the takeoff timing to the landing timing.

The detection method according to the present embodiment allows calculation of at least one of the on-ground duration from the landing timing to the takeoff timing and the in-air duration from the takeoff timing to the landing timing based on the detected landing timing and takeoff timing and display of the calculated duration in the display section.

A running motion evaluation method according to the present embodiment includes detecting motion course information in a side view of a user in running motion and calculating a propulsion efficiency index value representing the direction of propulsion relative to the advance direction by using the motion course information.

A running motion evaluation apparatus including the following components may be configured as another embodiment: a detection section that detects motion course information in a side view of a user in running motion and a calculation section that calculates a propulsion efficiency index value representing the orientation of propulsion relative to the advance direction by using the motion course information.

The running motion evaluation method and the like according to the present embodiment allows calculation of the propulsion efficiency index value, which represents the direction of propulsion relative to the advance direction, by using the motion course information in a side view of the user in running motion.

In the running motion evaluation method according to the embodiment described above, the detecting may be detecting position information in the side view of the user in such a way that the position information is contained at least in the motion course information.

The running motion evaluation method according to the present embodiment allows calculation of the propulsion efficiency index value by using the user's position in the side view thereof (side-view position).

In the running motion evaluation method according to the embodiment described above, the calculating may include determining the landing timing by using the motion course information, calculating the advance travel distance and the upward/downward amplitude in the range between front and behind landing positions by using the motion course information, and calculating the propulsion efficiency index value by using the travel distance and the amplitude.

The running motion evaluation method according to the present embodiment allows determination of the landing timing and calculation of the propulsion efficiency index value by using the advance travel distance and the upward/downward amplitude in the range between front and behind landing positions.

In the running motion evaluation method according to the embodiment described above, the calculating may include determining the landing timing and highest point reaching timing immediately before the landing timing by using the motion course information, calculating the advance travel distance and the upward/downward travel distance in the period between the landing timing and the highest point reaching timing by using the motion course information, and calculating the propulsion efficiency index value by using the advance travel distance and the upward/downward travel distance.

The running motion evaluation method according to the present embodiment allows determination of the landing timing and the highest point reaching timing immediately before the landing timing and calculation of the propulsion efficiency index value by using the advance travel distance and the upward/downward travel distance in the period between the landing timing and the highest point reaching timing.

In the running motion evaluation method according to the embodiment described above, the calculating may include determining lowest point reaching timing and highest point reaching timing immediately after the lowest point reaching timing by using the motion course information, calculating the advance travel distance and the upward/downward travel distance in the period between the lowest point reaching timing and the highest point reaching timing by using the motion course information, and calculating the propulsion efficiency index value by using the advance travel distance and the upward/downward travel distance.

The running motion evaluation method according to the present embodiment allows determination of lowest point reaching timing and highest point reaching timing immediately after the lowest point reaching timing and calculation of the propulsion efficiency index value by using the advance travel distance and the upward/downward travel distance in the period between the lowest point reaching timing and the highest point reaching timing.

In the running motion evaluation method according to the embodiment described above, the calculating may include determining an inflection point of the trajectory between a lowest point and a highest point based on the position information, calculating the tangential direction of the trajectory at the inflection point, and calculating the propulsion efficiency index value by using the tangential direction.

The running motion evaluation method according to the present embodiment allows determination of the inflection point based on the trajectory between the lowest point and the highest point and calculating the propulsion efficiency index value by using the tangential direction at the inflection point.

In the running motion evaluation method according to the embodiment described above, the calculating may include determining takeoff timing by using the motion course information and calculating the propulsion efficiency index value in the form of the orientation of propulsion relative to the advance direction at the takeoff timing.

The running motion evaluation method according to the present embodiment allows calculation of the propulsion efficiency index value in the form of the orientation of propulsion relative to the advance direction at the takeoff timing.

1. First Embodiment

A form for implementing the on-running landing position evaluation method and the on-running landing position evaluation apparatus according to an embodiment of the invention will be described below with reference to the drawings. It is noted that a first embodiment, which will be described below, does not limit the on-running landing position evaluation method or the on-running landing position evaluation apparatus according to other embodiments of the invention, and that a form to which the invention is applicable is not limited to the first embodiment. Further, the same portions have the same reference characters in the illustration of the drawings.

Overall Configuration

FIG. 1 shows an example of the configuration of a portable electronic apparatus 20 in the first embodiment. The portable electronic apparatus 20 is attached, when used, to a body portion or the waist of a user 10 who is running. The portable electronic apparatus 20 includes operation switches 21, a display 22, a loudspeaker 23, and other components and incorporates an IMU (inertial measurement unit) 30 and a controller (not shown) in which a CPU (central processing unit) and a memory are implemented.

The IMU 30 is a sensor unit including an acceleration sensor and a gyro sensor. The acceleration sensor detects acceleration in a sensor coordinate system (local coordinate system) that is a three-dimensional orthogonal coordinate system (x, y, and z) related to the sensor. The gyro sensor detects angular velocity in a sensor coordinate system that is a three-dimensional orthogonal coordinate system (x, y, and z) related to the sensor.

The following description will be made assuming that the sensor coordinate system of the acceleration sensor and the sensor coordinate system of the gyro sensor coincide with each other in a coordinate axis. When they differ from each other, one of the coordinate systems can be converted into the other coordinate system by performing coordinate conversion matrix operation. The coordinate conversion matrix operation can be performed by using a known approach.

The portable electronic apparatus 20 can calculate the position, speed, attitude, and other parameters of the apparatus by performing inertial navigation computation using measurement results from the IMU 30. The portable electronic apparatus 20 is also an on-running landing position evaluation apparatus capable of evaluation of the landing position of the user 10 who is running, which is a kind of running motion analysis function, by using a calculation result of the inertial navigation computation.

A travel object coordinate system and an absolute coordinate system are now defined. The travel object coordinate system is a three-dimensional orthogonal coordinate system (P, Q, and R) related to the user 10 and has three axes defined as follows: The advance direction (orientation) of the user 10 is an R-axis positive direction; the upward vertical direction is a Q-axis positive direction; and the rightward/leftward direction of the user 10 that is perpendicular to the R axis and the Q axis is a P axis. The absolute coordinate system is a three-dimensional coordinate system (X, Y, and Z) defined, for example, as an ECEF (earth centered earth fixed) coordinate system and has three axes defined as follows: The upward vertical direction is a Y-axis positive direction; and the horizontal direction is X-axis and Z-axis directions.

Principle (A) Running Cycle

Figure 2:
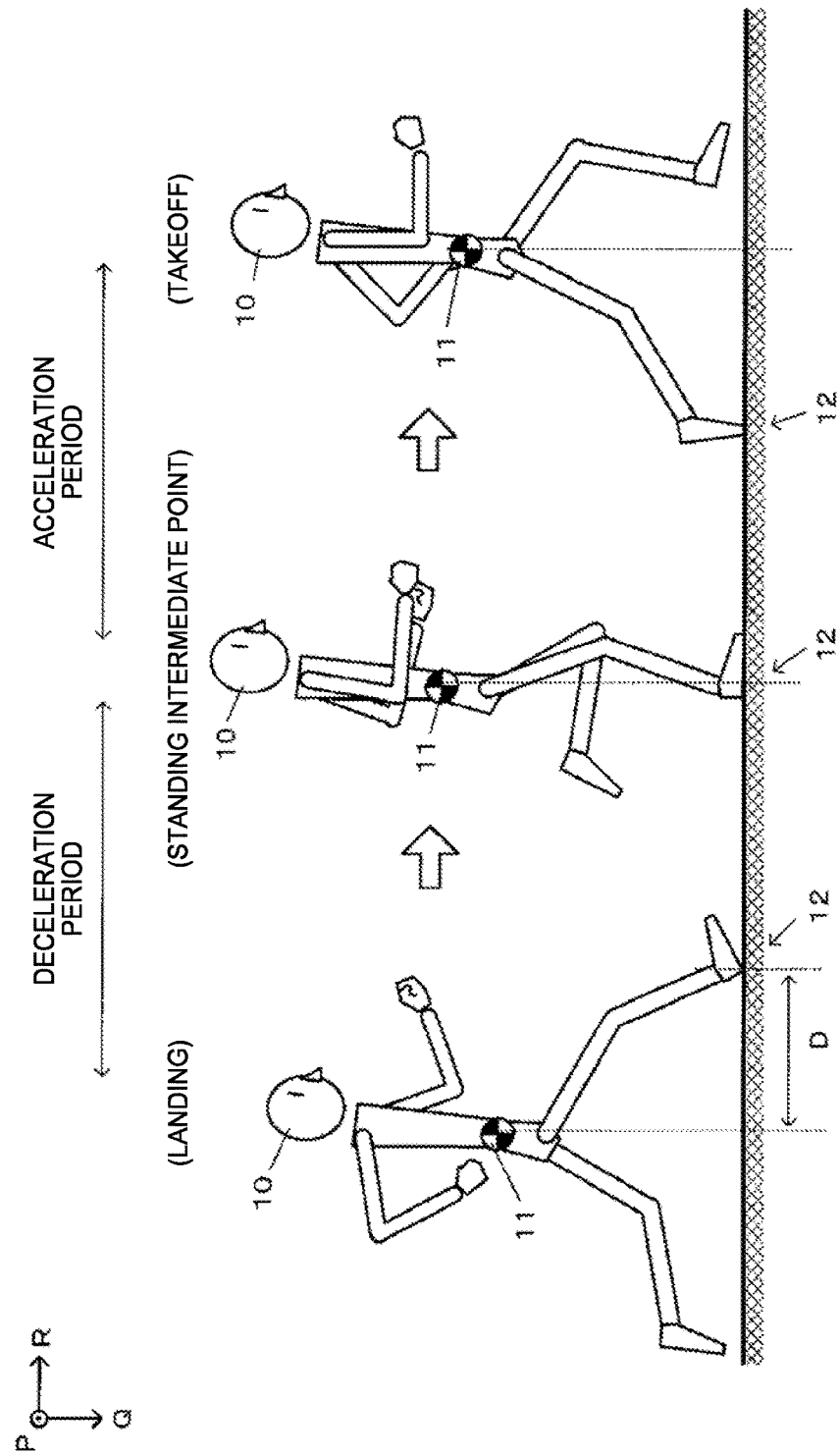
FIG. 2 describes a running cycle.

A running cycle will first be described. FIG. 2 shows the running cycle corresponding to one footstep viewed from a side of the user 10 who is running. In FIG. 2, the advance direction (R-axis positive direction) of the user 10 is assumed to be right direction, and transition of the attitude of the user 10 is shown from left to right.

The running cycle corresponding to one footstep starts from "landing," which is a state in which one of the legs of the user 10 (right leg in FIG. 2) comes into contact with the ground, as shown in the left portion of FIG. 2. At this point, a landing position 12 is typically a forward position from a center of gravity 11 of the user 10. The center of gravity 11 then moves forward, and the state transitions to the "standing intermediate point," at which the center of gravity 11 is roughly immediately above the landing position 12, as shown in the middle portion of FIG. 2. Subsequently, the center of gravity 11 further moves forward, and the running cycle is completed by "takeoff," which is a state in which the one leg (right leg) in contact with the ground takes off the ground, as shown in the right portion of FIG. 2.

The period from the landing timing to the takeoff timing is the on-ground duration corresponding to one footstep. In the on-ground duration, the period from the landing to the standing intermediate point is the deceleration period in which the braking force due to reaction of the landing acts, and the period from the standing intermediate point to the takeoff is an acceleration period in which propulsion produced when the leg on the ground kicks the ground acts.

(B) Evaluation of Landing Position

In running motion, it is believed desirable that the user lands on the ground in a position roughly immediately below the center of gravity of the user (hereinafter referred to as "landing immediately below"). That is, at the landing timing in the left portion of FIG. 2, a center of gravity-landing position distance D, which is the distance along the advance direction between the center of gravity 11 and the landing position 12 of the user 10, is preferably short. That is, the shorter the center of gravity-landing position distance D, the "better" the evaluation about the landing position 12.

In comparison between the left portion and the central portion of FIG. 2, the center of gravity-landing position distance D corresponds to the distance along the advance direction between the position of the center of gravity 11 at the timing of the landing and the position of the center of gravity 11 at the timing of the standing intermediate point, that is, the travel distance of the center of gravity 11 in the deceleration period. The portable electronic apparatus 20 is attached to a body portion of the user 10, that is, in a position close to the center of gravity 11. The travel distance of the portable electronic apparatus 20 is therefore considered to be equal to the travel distance of the center of gravity 11 of the user 10 and hence to the center of gravity-landing position distance D, and the travel distance of the portable electronic apparatus 20 in the deceleration period is used in the evaluation of the landing position of the user 10.

(C) Determination of Deceleration Period

To calculate the travel distance of the portable electronic apparatus 20 in the deceleration period, the deceleration period is first determined. In the present embodiment, the deceleration period is determined by determining the landing timing, which is the point of time when the deceleration period starts, and the standing intermediate point timing, which is the point of time when the deceleration period ends, based on a detection value (acceleration) of the acceleration sensor 31.

(C-1) Determination of Landing

The landing timing is determined based on the acceleration along the advance direction of the user 10 (advance acceleration: R-axis acceleration).

Figure 3:
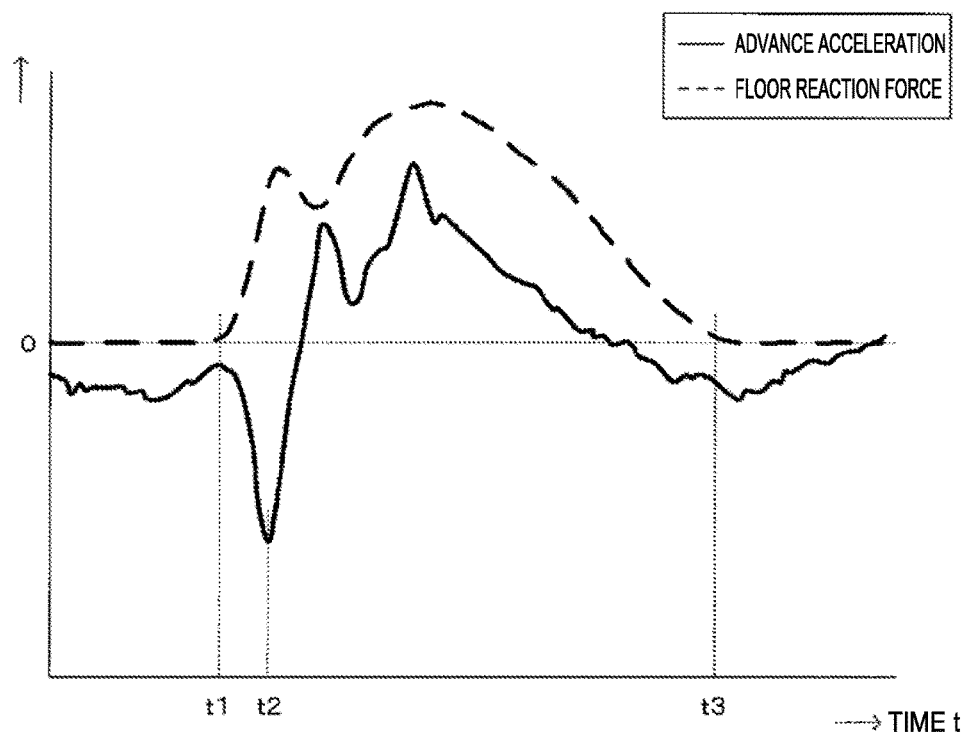
FIG. 3 describes determination of landing timing.

FIG. 3 shows a graph of the advance acceleration corresponding to one footstep. FIG. 3 also shows a graph of the magnitude of floor reaction force as well as the graph of the advance acceleration. In FIG. 3, the horizontal axis of the graph represents time, and the vertical axis represents the advance acceleration and the floor reaction force. The graphs are obtained in an experiment in which the user having an acceleration sensor attached to a body portion (waist) runs on a floor in which a floor reaction force meter is installed.

The acceleration measured with the acceleration sensor is acceleration in the sensor coordinate system (x, y, and z) related to the sensor. After the acceleration in the sensor coordinate system is converted into the acceleration in the travel object coordinate system, the acceleration in the R axis of the travel object coordinate system is the advance acceleration indicated by the graph in FIG. 3. The conversion from the sensor coordinate system into the travel object coordinate system is performed in the course of the inertial navigation computation.

The floor reaction force is force (reaction force) produced in a state in which a leg is in contact with the ground (floor) and is zero when the leg is not in contact with the ground (floor). That is, in the graph in FIG. 3, time t1, when the magnitude of the floor reaction force starts increasing from zero, is the landing timing, and time t3, when the magnitude of the floor reaction force becomes zero, is the takeoff timing.

The advance acceleration instantaneously changes by a large amount in the negative direction at the landing because braking force resulting from the floor reaction force acts. Comparison between the graph of the advance acceleration and the graph of the magnitude of the floor reaction force shows that the advance acceleration has a local maximum at the landing timing. That is, in the advance acceleration corresponding to one footstep from landing to takeoff, the time t1, when the advance acceleration has a local maximum and which is immediately before the time t2, when the advance acceleration has a minimum, is the landing timing. Detecting the local maximum allows determination of the landing timing.

(C-2) Determination of Standing Intermediate Point

The timing of the standing intermediate point is determined based on the acceleration in the vertical direction (vertical acceleration: Q-axis acceleration).

Figure 4:
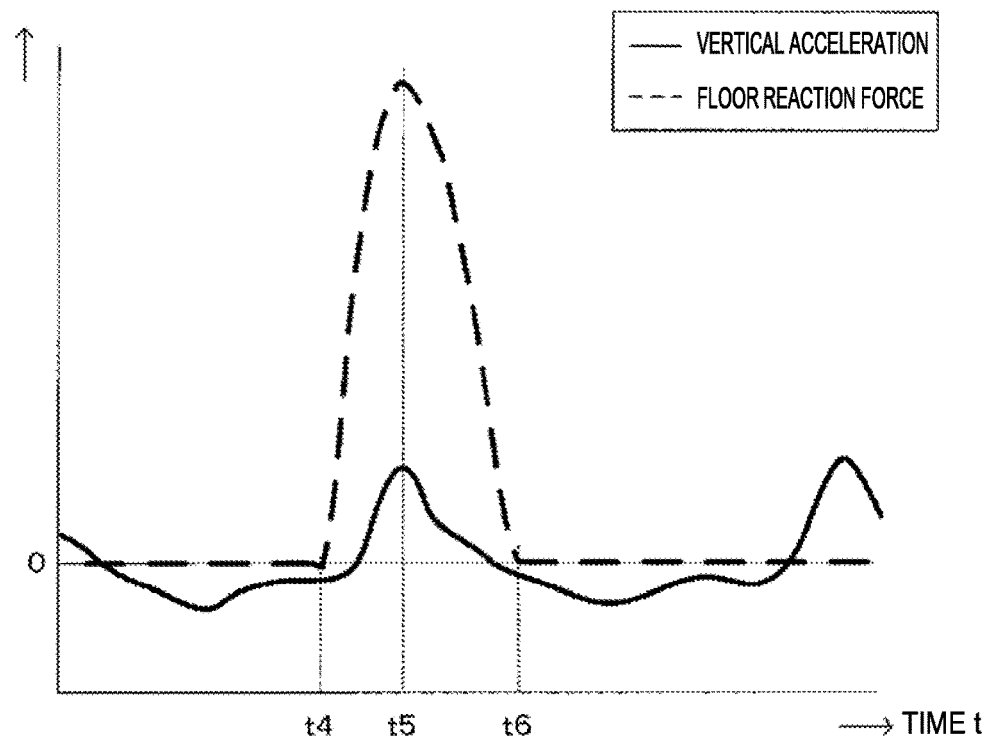
FIG. 4 describes determination of standing intermediate point timing.

FIG. 4 shows a graph of the vertical acceleration corresponding to one footstep. FIG. 4 also shows a graph of the floor reaction force as well as the graph of the vertical acceleration. In FIG. 4, the horizontal axis of the graph represents time, and the vertical axis represents the vertical acceleration and the floor reaction force. The graphs are obtained in an experiment in which the user having an acceleration sensor attached to a body portion (waist) runs on a floor in which a floor reaction force meter is installed.

The acceleration measured with the acceleration sensor is acceleration in the sensor coordinate system (x, y, and z) related to the sensor. After the acceleration in the sensor coordinate system is converted into the acceleration in the travel object coordinate system, the acceleration in the Q axis of the travel object coordinate system is the vertical acceleration indicated by the graph in FIG. 4. The conversion from the sensor coordinate system into the travel object coordinate system is performed in the course of the inertial navigation computation.

The floor reaction force changes with the angle of a leg with respect to the ground (floor) and is maximized at time t5, which is the standing intermediate point, when the center of gravity 11 of the user is roughly immediately above the landing position. Comparison between the graph of the vertical acceleration and the graph of the floor reaction force shows that the timing when the floor reaction force is maximized roughly coincides with the timing when the vertical acceleration is maximized. That is, in the vertical acceleration corresponding to one footstep, detecting the time t5, when the vertical acceleration is maximized, allows determination of the timing of the standing intermediate point.

(D) Travel Distance in Deceleration Period

The travel distance in the deceleration period is subsequently calculated. Specifically, the period from the landing timing to the standing intermediate point timing is called the length ΔT of the deceleration period. Further, the average of the speed V1 at the landing timing and the speed V2 at the standing intermediate point timing is considered as a deceleration period speed V (=(V1+V2)/2). Each of the speeds V1 and V2 is assumed to be the speed along the advance direction of the user 10. The product of the calculated travel speed V in the deceleration period and the calculated length ΔT of the deceleration period is called a deceleration period travel distance L (=V×ΔT).

(E) Display of Evaluation Result

Figure 5:
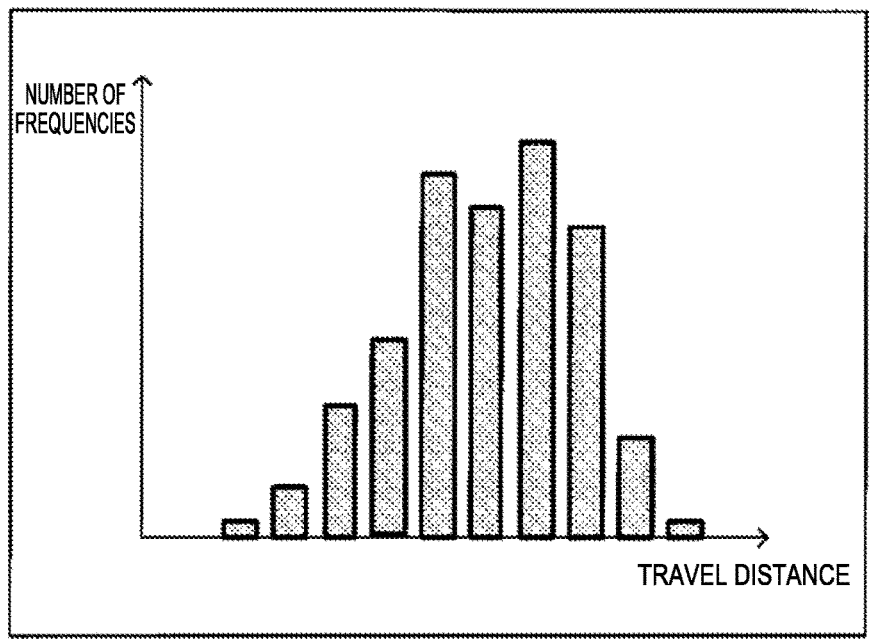
FIGS. 5A and 5B show examples of a displayed evaluation result.
Figure 5:
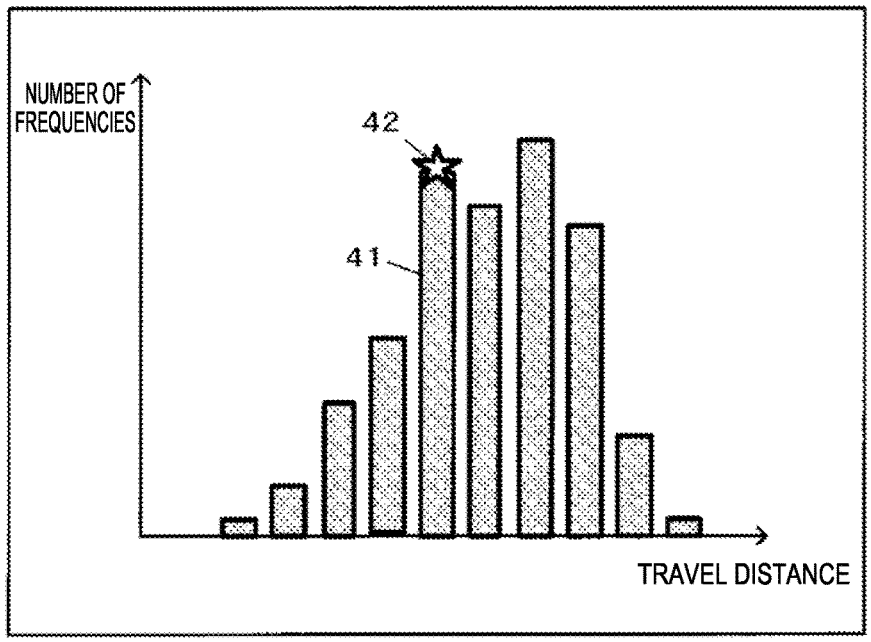

The travel distance in the deceleration period for each footstep (whenever events from landing to takeoff occur) calculated as described above is displayed as a result of the evaluation of the landing position in the display 22, for example, as shown in FIG. 5A. FIG. 5A shows an example of a displayed evaluation result. The display example in FIG. 5A is drawn in a histogram form in which the horizontal axis represents the travel distance and the vertical axis represents the number of calculation operations (number of frequencies).

Instead, the travel distance in the deceleration period can be calculated during running motion in a realtime manner, and the latest travel distance and past travel distances can be displayed with the two types of travel distance distinguished from each other. In this case, whenever the user runs by a distance corresponding to one footstep, not only can the travel distance in the deceleration period of the running motion be calculated, and "1" can be added to the number of frequencies corresponding to the newly calculated travel distance to update the display, but also a predetermined mark 42 can be added to a graph 41 corresponding to the newly calculated travel distance or the graph 41 can be highlighted, as shown in FIG. 5B.

Still instead, whenever the travel distance in the deceleration period is calculated, the calculated travel distance may be displayed in the form of a numeral. The shorter the travel distance in the deceleration period, the closer to the position immediately below the center of gravity the landing position. The displayed numeral is therefore meaningful to the user even only the numeral is displayed.

In a case where a terminal device responsible for the display function of the portable electronic apparatus 20 shown in FIG. 1 is separate therefrom and the portable electronic apparatus 20 and the terminal device are connected to each other over wireless communication, the terminal device may display an evaluation result. The terminal device may be a wristwatch-type device, a smartphone, or a tablet terminal.

Internal Configuration

Figure 6:
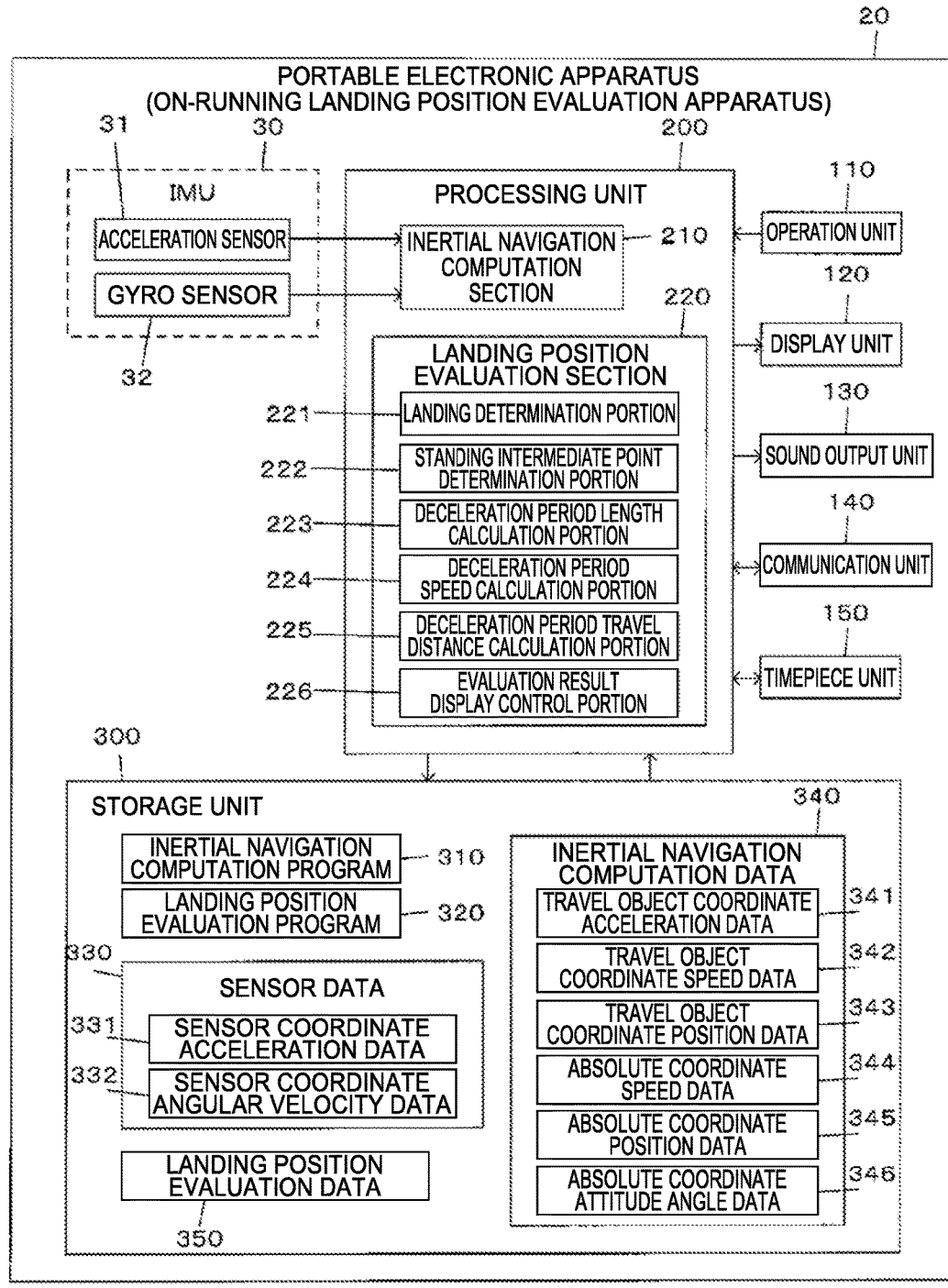
FIG. 6 is a functional configuration diagram of the portable electronic apparatus.

FIG. 6 is a block diagram showing the functional configuration of the portable electronic apparatus 20. The portable electronic apparatus 20 includes the IMU 30, an operation unit 110, a display unit 120, a sound output unit 130, a communication unit 140, a timepiece unit 150, a processing unit 200, and a storage unit 300, as shown in FIG. 6.

The IMU 30 has an acceleration sensor 31 and a gyro sensor 32. The acceleration sensor 31 detects acceleration along each of the axes (x axis, y axis, and z axis) of the sensor coordinate system. The acceleration detected with the acceleration sensor 31 (sensor coordinate acceleration) is related to measurement time and accumulated and stored as sensor coordinate system acceleration data 331. The gyro sensor 32 detects angular velocity along each of the axes (x axis, y axis, and z axis) of the sensor coordinate system. The angular velocity detected with the gyro sensor 32 (sensor coordinate angular velocity) is related to measurement time and accumulated and stored as sensor coordinate angular velocity data 332.

The operation unit 110 is achieved by an input device, such as a touch panel or button switches, and outputs an operation signal according to performed operation to the processing unit 200. The operation switches 21 in FIG. 1 correspond to the operation unit 110.

The display unit 120 is achieved by a display device, such as an LCD (liquid crystal display), and performs a variety of display operations based on a display signal from the processing unit 200. The display 22 in FIG. 1 corresponds to the display unit 120.

The sound output unit 130 is achieved by a sound output device, such as a loudspeaker, and outputs a variety of sounds based on a sound signal from the processing unit 200. The loudspeaker 23 in FIG. 1 corresponds to the sound output unit 130.

The communication unit 140 is achieved by a wireless communication device, such as a wireless LAN (local area network) and a Bluetooth (registered trademark) device, a communication cable jack, a control circuit, and other components for wired communication, and communicates with an external apparatus.

The timepiece unit 150 is an internal timepiece of the portable electronic apparatus 20, is formed of an oscillation circuit having a quartz oscillator and other components, and outputs time signals carrying clocked current time, elapsed time from specified timing, and other types of time to the processing unit 200.

The processing unit 200 is achieved by a computation device, such as a CPU, and performs overall control of the portable electronic apparatus 20 based on a program and data stored in the storage unit 300, operation signals from the operation unit 110, and other types of information. In the present embodiment, the processing unit 200 includes an inertial navigation computation section 210 and a landing position evaluation section 220.

The inertial navigation computation portion 210 performs an inertial navigation computation process by using detection results from the IMU 30 (sensor coordinate acceleration detected with acceleration sensor 31 and sensor coordinate angular velocity detected with gyro sensor 32) to calculate the position (absolute coordinate position), the speed (absolute coordinate speed), and the attitude angle (absolute coordinate attitude angle) of the apparatus in the absolute coordinate system. In the course of the inertial navigation computation process, the sensor coordinate system (x, y, and z) undergoes coordinate conversion into the travel object coordinate system (P, Q, and R) and the absolute coordinate system (X, Y, and Z).

A detailed description will be made. With reference to the facts that when the user is stationary, force acting on the user is only gravitational acceleration and that when the user starts traveling, force acting on the user is only acceleration in the travel direction as well as the gravitational acceleration, an initial attitude angle of the IMU 30 in the absolute coordinate system (absolute coordinate attitude angle) is calculated based on detection results from the IMU 30. That is, the travel object coordinate system (P, Q, and R) in an initial state can be defined, and a coordinate conversion matrix used to convert the sensor coordinate system into the travel objet coordinate system is determined. Therefore, after a position where the user starts traveling is set, the inertial navigation computation is achieved by calculating a travel speed vector in the travel object coordinate system based on detection results from the IMU 30 whenever necessary and causing the travel speed vector to undergo concatenative integration. The position and speed of the user who is running are determined in the absolute coordinate system by specifying the travel start position in the absolute coordinate system.

Further, since the orientation of the user can be known whenever necessary by using a detection value from the gyro sensor 32 to correct the absolute coordinate attitude angle, the travel object coordinate system is updated whenever necessary, whereby the absolute coordinate position, the absolute coordinate speed, and the absolute coordinate attitude angle of the user who is traveling are obtained as computation results of the inertial navigation.

The R-axis direction of the travel object coordinate system in running motion (see FIG. 1), however, changes in accordance with the orientation of the body of the user 10 who is running. Specifically, the user 10 who is running advances with a body portion including the waist twisting alternately rightward and leftward because the user 10 sequentially lets the right and left legs out. That is, since the orientation of the body portion swings rightward and leftward, in the travel object coordinate system, the R-axis direction of which coincides with the orientation of the body portion, the yaw angle periodically changes. As a result, when the travel speed vector determined in the travel object coordinate system is simply caused to undergo concatenative integration, the absolute coordinate position, the absolute coordinate speed, and the absolute coordinate attitude angle are contaminated with errors and are therefore not determined correctly.

To avoid the situation described above, the rightward and leftward rotation (twist motion) of the body portion is regarded as noise, and a correction process of correcting the errors having contaminated an inertial navigation computation result is carried out for correction of the travel object coordinate system. Specifically, Kalman filtering, in which a state vector X has components of a change in each of the absolute speed vector, the absolute coordinate attitude angle, the absolute coordinate position, and the yaw angle (difference between previous value and current value: error) and an observation value Z is a change in the yaw angle determined from a detection value from the gyro sensor 32, is applied to correct the absolute coordinate speed, the absolute coordinate attitude angle, and the absolute coordinate position. As a result of the correction process, a change in the yaw angle is suppressed, whereby the advance direction of the user 10, that is, the R-axis direction of the travel object coordinate system is corrected. In the present embodiment, it is assumed that the inertial navigation computation section 210 carries out whenever necessary a computation process that is basically inertial navigation computation of related art but the correction process based on Kalman filtering is built therein. In the following description, what is hereinafter simply called "inertial navigation computation" or an "inertial navigation computation process" is a process having the correction process described above built therein.

Computation results of the inertial navigation computation performed by the inertial navigation computation section 210 are stored as inertial navigation computation data 340. The inertial navigation computation data 340 contains absolute coordinate speed data 344, absolute coordinate position data 345, and absolute coordinate attitude angle data 346, which are data on the speed, the position, and the attitude angle at each time in the absolute coordinate system, and travel object coordinate acceleration data 341, travel object coordinate speed data 342, and travel object coordinate position data 343, which are data on the acceleration, the speed, and the position at each time in the travel object coordinate system.

The landing position evaluation section 220 includes a landing determination portion 221, a standing intermediate point determination portion 222, a deceleration period length calculation portion 223, a deceleration period speed calculation portion 224, a deceleration period travel distance calculation portion 225, and an evaluation result display control portion 226 and evaluates the landing position of the user 10 based on detection results from the IMU 30.

The landing determination portion 221 determines the landing timing based on a detection value from the acceleration sensor 31. That is, the landing determination portion 221 determines the landing timing to be the time when the advance acceleration corresponding to one footstep is locally maximized immediately before minimized (see FIG. 3). The advance acceleration is stored as R-axis acceleration in the travel object coordinate acceleration data 341.

The standing intermediate point determination portion 222 determines the standing intermediate point timing based on a detection value from the acceleration sensor 31. That is, the standing intermediate point determination portion 222 determines the standing intermediate point timing to be the time when the vertical acceleration corresponding to one footstep is maximized (see FIG. 4). The vertical acceleration is stored as Q-axis acceleration in the travel object coordinate acceleration data 341.

The deceleration period length calculation portion 223 calculates the length $\Delta T$ of the deceleration period in the form of the length of period from the landing timing determined by the landing determination portion 221 to the standing intermediate point timing determined by the standing intermediate point determination portion 222.

The deceleration period speed calculation portion 224 calculates the speed V in the deceleration period in the form of the average of a speed V1 at the landing timing and a speed V2 at the standing intermediate point timing. Each of the speeds V1 and V2 is a speed along the advance direction of the user 10 and is stored as the R-axis speed in the travel object coordinate speed data 342.

The deceleration period travel distance calculation portion 225 calculates the travel distance L in the deceleration period in the form of the product of the length $\Delta T$ of the deceleration period calculated by the deceleration period length calculation portion 223 and the speed V calculated by the deceleration period speed calculation portion 224.

The travel distance in the deceleration period calculated by the deceleration period travel distance calculation portion 225 is accumulated and stored as an evaluation result of the landing position in the form of landing position evaluation data 350. FIG. 7 shows an example of the data configuration of the landing position evaluation data 350. According to FIG. 7, the landing position evaluation data 350 stores, in relation to a measurement number 351, which is counted whenever measurement is performed on a footstep basis, the landing timing 352, which is the timing when the deceleration period starts, the standing intermediate point timing 353, which is the timing when the deceleration period ends, the length 354 of the deceleration period, the speed 355, and the travel distance 356.

The evaluation result display control portion 226 controls the display section 120 to cause it to display an evaluation result of the landing position based on the landing position evaluation data 350. The evaluation result may be displayed after the running motion ends (see FIG. 5A) or may be updated and displayed during running motion in a realtime manner whenever one footstep is taken (see FIG. 5B).

The storage section 300 is achieved by a storage device, such as a ROM (read only memory) and a RAM (random access memory), stores a program, data, and other types of information that allows the processing unit 200 to oversee and control the portable electronic apparatus 20, and is used as a work area for the processing unit 200 where results of computation performed by the processing section 200 in accordance with a variety of programs, sensor data from the IMU 30, and other types of information are temporarily stored.

In the present embodiment, the storage unit 300 stores an inertial navigation computation program 310, a landing position evaluation program 320, sensor data 330, the inertial navigation computation data 340, and the landing position evaluation data 350. The sensor data 330 contains the sensor coordinate acceleration data 331 and the sensor coordinate angular velocity data 332. The inertial navigation computation program 310 is a program for causing the processing unit 200 to function as the inertial navigation computation section 210, and the landing position evaluation program 320 is a program for causing the processing unit 200 to function as the landing position evaluation section 220.

Process Flow

Figure 8:
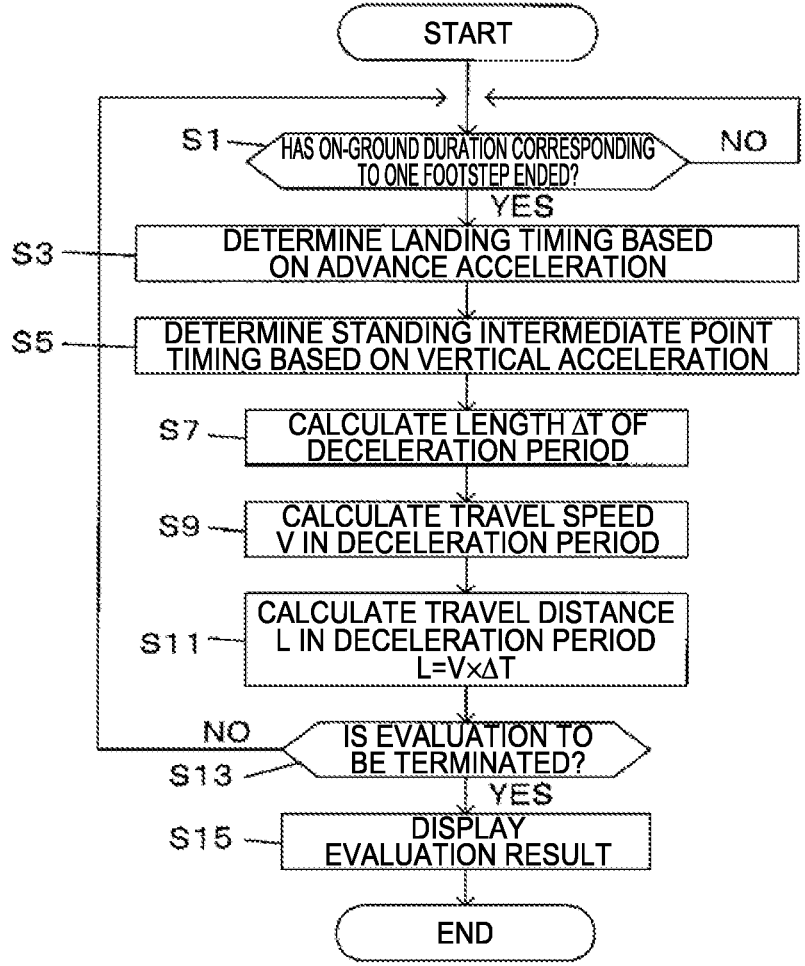
FIG. 8 is a flowchart of a landing position evaluation process.

FIG. 8 is a flowchart for describing the flow of a landing position evaluation process. The process is carried out by the landing position evaluation section 220 in accordance with the landing position evaluation program 320, and the user 10 to whom the portable electronic apparatus 20 is attached issues, before the user starts running, an instruction to start the evaluation.

Whether the on-ground duration corresponding to one footstep has ended is first determined based on a detection value (acceleration) from the acceleration sensor. A change in acceleration during the in-air duration, in which neither of the user's legs is in contact with the ground, is smaller than a change in acceleration in the on-ground duration, in which either of the legs is in contact with the ground. In view of the fact described above, a change in the acceleration allows the on-ground duration and the in-air duration to be distinguished from each other and whether the on-ground duration has ended to be determined. When the evaluation result shows that the on-ground duration corresponding to one footstep has ended (step S1: YES), the landing position in the running motion of the one footstep having ended is evaluated.

That is, the landing determination portion 221 determines the landing timing based on the advance acceleration corresponding to the one footstep having ended (step S3). The standing intermediate point determination portion 222 determines the standing intermediate point timing based on the vertical acceleration corresponding to the one footstep having ended (step S5). The deceleration period length calculation portion 223 then calculates the length $\Delta T$ of the deceleration period in the form of the period from the determined landing timing to the determined standing intermediate point timing (step S7). The deceleration period speed calculation portion 224 calculates the speed V in the deceleration period, for example, in the form of the average of the speed V1 at the landing timing and the speed V2 at the standing intermediate point timing (step S9). The deceleration period travel distance calculation portion 225 then calculates the travel distance in the deceleration period in the form of the product of the calculated length $\Delta T$ of the deceleration period and the calculated speed V (step S11).

The landing position evaluation section 220 then determines whether an instruction to terminate the evaluation has been issued. When no evaluation termination instruction has been issued (step S13: NO), the control returns to step S1.

When the evaluation termination instruction has been issued (step S13: YES), the evaluation result display control portion 226 displays an evaluation result (step S15). After the process described above has been carried out, the landing position evaluation section 220 terminates the process.

Advantageous Effect

As described above, the portable electronic apparatus 20 according to the first embodiment allows evaluation of the landing position during running motion based on a detection value (acceleration) from the acceleration sensor 31 without use of any other external apparatus.

Variations

An embodiment to which the invention is applicable is not, of course, limited to the embodiment described above, which can be changed as appropriate to the extent that the change does not depart from the substance of the invention.

(A) Calculation of Travel Distance Based on Position Sensing

In the embodiment described above, the travel distance in the deceleration period is calculated in the form of the product of the length ΔT of the deceleration period and the travel speed V. The travel distance may instead be calculated by position sensing. Specifically, the inertial navigation computation provides a calculated position of the portable electronic apparatus 20. Positions P1 and P2 provided by the inertial navigation computation at the landing timing and the standing intermediate point timing are acquired, and the distance between the positions P1 and P2 is used as the travel distance L in the deceleration period.

(B) Man-Machine Interface Function

A device having a man-machine interface function of interfacing with the portable electronic apparatus 20 described in the above embodiment may be provided. Specifically, for example, a terminal device having a function corresponding to the display unit 120 is provided in the form of a wristwatch-type device and is communicatably connected to the portable electronic apparatus 20 over wireless communication. An evaluation result from the landing position evaluation section 220 may be displayed in the terminal device whenever necessary. Further, the terminal device may have functions corresponding to the operation unit 110 and the sound output unit 130 as well as the display unit 120.

2. Second Embodiment

A form for implementing the detection method and the detection apparatus according to an embodiment of the invention will be described below with reference to the drawings. In a second embodiment, a running information calculation system in which the detection apparatus is incorporated is presented by way of example. It is noted that the second embodiment, which will be described below, does not limit the detection method or the detection apparatus according to other embodiments of the invention, and that a form in which the detection method and detection apparatus according to an embodiment of the invention can be implemented is not limited to the following second embodiment. Further, the same portions have the same reference characters in the illustration of the drawings.

First Example

Figure 9:
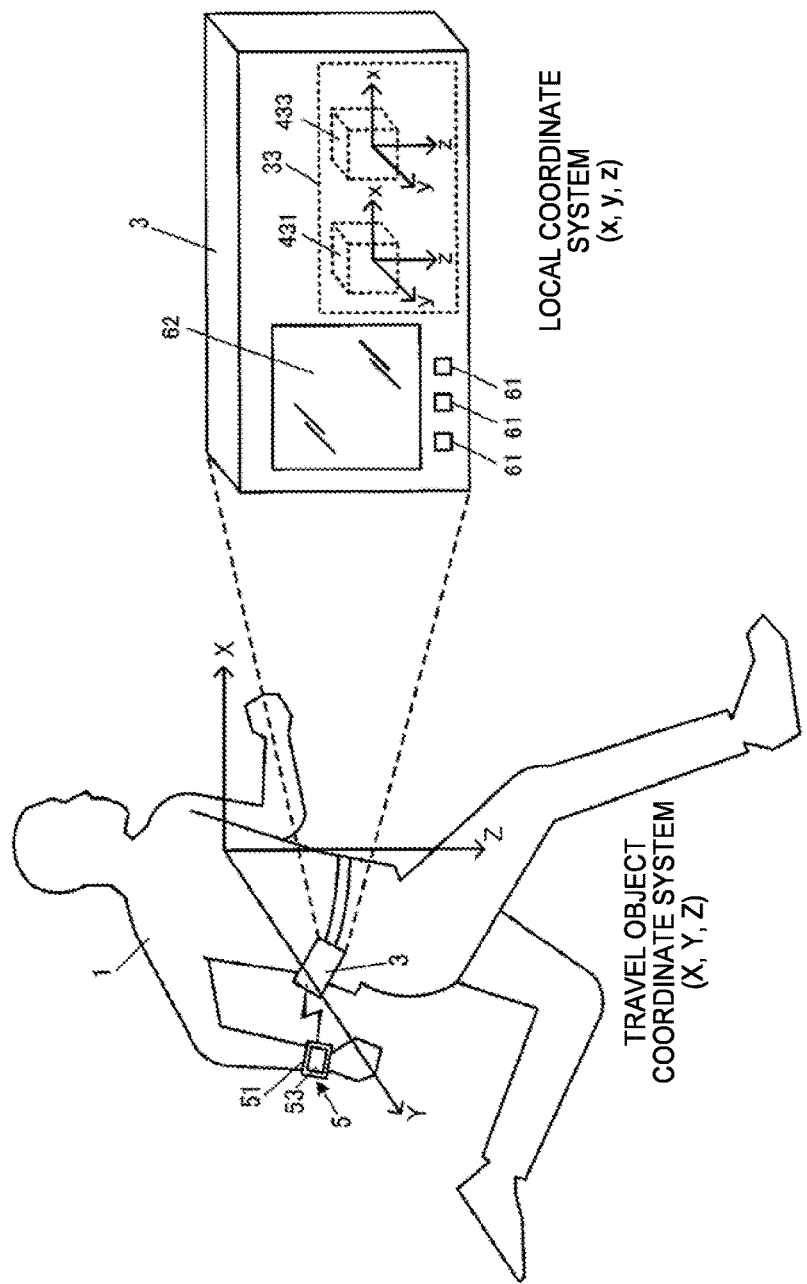
FIG. 9 is a diagrammatic view showing an example of the overall configuration of a running information calculation system in a first example of a second embodiment.

A first example of the second embodiment will first be described. FIG. 9 is a diagrammatic view showing the overall configuration of a running information calculation system including a running information calculation apparatus 3 in the first example of the second embodiment. The running information calculation apparatus 3 is a compact electronic apparatus used by a user 1 who is running and carried, along with a display apparatus 5, which is a separate apparatus, by the user 1. The running information calculation apparatus 3 and the display apparatus 5 are so configured that they can transmit and receive data to and from each other over wireless communication. For example, the running information calculation apparatus 3 is attached to a body portion (right waist or left waist, for example) of the user 1, and the display apparatus 5 is attached to an arm (right arm or left arm) of the user 1, as shown in FIG. 9.

The running information calculation apparatus 3 includes button switches 61 and a display 62 as appropriate, which are disposed, for example, on the front surface of an enclosure, and incorporates an IMU 33, which is known as an inertial measurement unit. The IMU 33 is a sensor unit including an acceleration sensor 431 and a gyro sensor 433 and detects acceleration and angular velocity along and around each axis of a local coordinate system (sensor coordinate system) that is a common three-dimensional orthogonal coordinate system related to the sensors 431 and 433. The three axes of the local coordinate system are called an x axis, a y axis, and a z axis.

The running information calculation apparatus 3 causes an acceleration vector (local coordinate acceleration vector) measured with the acceleration sensor 431 in the local coordinate system to undergo coordinate conversion into a vector in the travel object coordinate system that is a three-dimensional orthogonal coordinate system related to the user 1 to calculate a travel object coordinate acceleration vector. The travel object coordinate system is, for example, a coordinate system defined by a frontward/rearward direction (advance direction) the positive side of which coincides with the front side of the user 1, a rightward/leftward direction the positive side of which coincides with the right side of the user 1, and the gravity direction (upward/downward direction) the positive side of which coincides with the vertically lower side. In the travel object coordinate system, the advance direction is called an X axis, the rightward/leftward direction is called a Y axis, and the upward/downward direction is called a Z axis.

In an actual process, the direction of the acceleration vector detected with the acceleration sensor 431 in a state in which the user 1 has not yet started running but is stationary (gravity direction) is assumed to be the positive Z-axis direction (downward direction). Further, the direction of the acceleration vector detected when the user 1 starts running and takes a footstep forward from the stationary state is assumed to be the positive X-axis direction (advance direction). The direction perpendicular to the Z-axis direction and the X-axis direction is the Y-axis direction (rightward/leftward direction), and a coordinate conversion matrix used to convert the local coordinate system into the travel object coordinate system is determined for initialization of the travel object coordinate system.

Afterwards, a detection value from the gyro sensor 433 can be used to correct the travel object coordinate system whenever necessary. Since the user 1 who is running sequentially lets the right and left legs out to travel with a body portion including the waist twisting alternately rightward and leftward, the rightward and leftward rotation (twist motion) of the body portion may be regarded as noise, and Kalman filtering for reducing the noise may be applied to correct the travel object coordinate system (advance direction (X-axis direction), in particular) whenever necessary.

The running information calculation apparatus 3 then detects the landing timing and the takeoff timing based on advance acceleration in the form of the acceleration in the advance direction contained in the travel object coordinate acceleration vector (X-axis component of travel object coordinate acceleration vector) and upward/downward acceleration in the form of the acceleration in the upward/downward direction contained in the travel object coordinate acceleration vector (Z-axis component of travel object coordinate acceleration vector), calculates predetermined evaluation index values, and transmits the calculated evaluation index values to the display apparatus 5. In the first example, the following values are, for example, calculated as the evaluation index values based on the detected landing timing and takeoff timing: the on-ground duration from the landing timing to the takeoff timing; the in-air duration from the takeoff timing to the landing timing; and the ratio of the in-air duration to the on-ground duration (on-ground-to-in-air duration ratio).

The running information calculation apparatus 3 further integrates the travel object coordinate acceleration vector to calculate a speed vector (travel object coordinate speed vector) for calculation of the travel speed (running speed) of the user 1 whenever necessary and calculation of the distance traveled since the user 1 started running (running distance) whenever necessary and transmits the calculated travel speed and distance to the display apparatus 5. The term "integrate" means accumulative addition of a value corresponding to predetermined unit time. The running speed and the running distance are examples of running data.

The display apparatus 5 receives and displays the evaluation index values and the running data transmitted from the running information calculation apparatus 3 and includes a display section 53, which is disposed on the front surface of a body case 51 (surface oriented outward when the display apparatus 5 is attached to the user 1). Although not shown, the display apparatus 5 further includes button switches and a loudspeaker disposed at appropriate locations of the body case 51, a touch panel integrally formed with a display screen of the display section 53, and other components. The running data and other types of information may be displayed also on the display 62 of the running information calculation apparatus 3.

Functional Configuration

Figure 10:
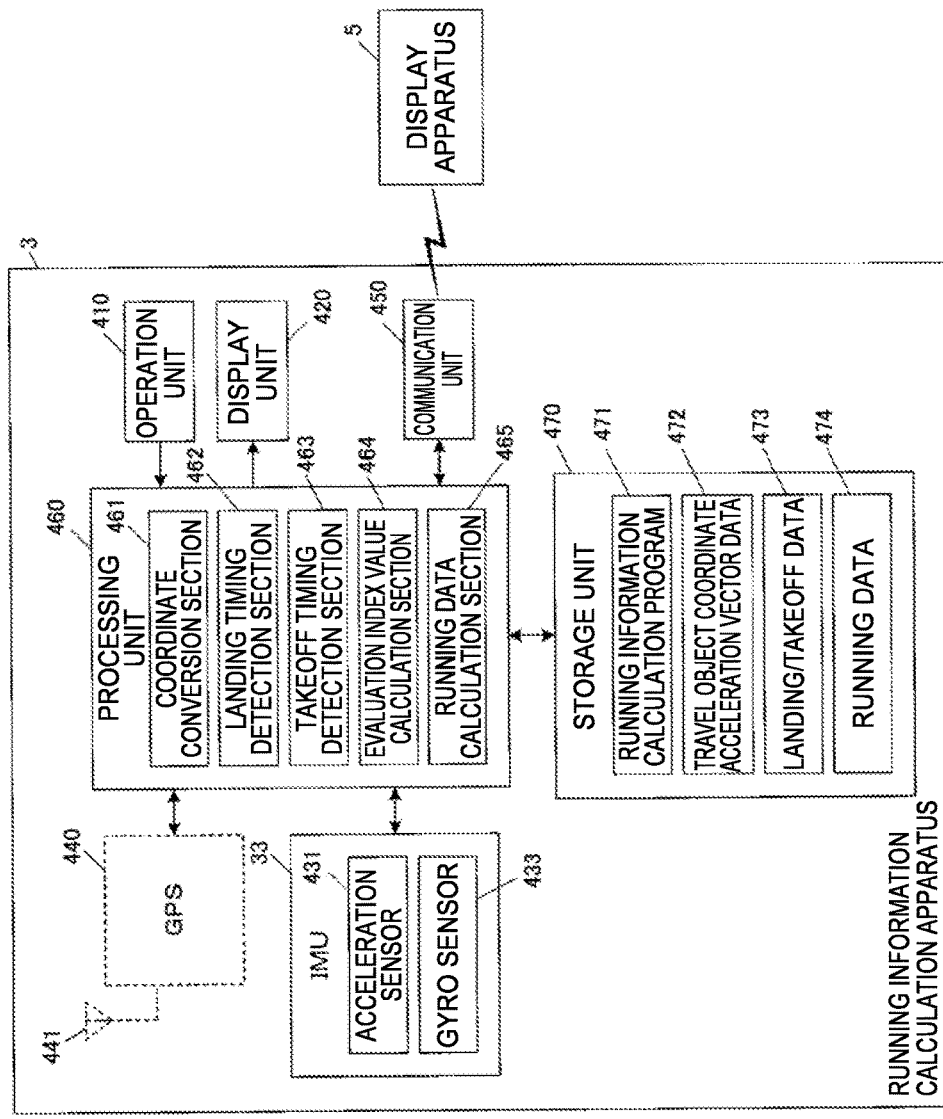
FIG. 10 is a block diagram showing an example of the functional configuration of a running information calculation apparatus in the first example of the second embodiment.

FIG. 10 is a block diagram showing an example of the functional configuration of the running information calculation apparatus 3 in the first example. The running information calculation apparatus 3 includes an operation unit 410, a display unit 420, an IMU 33, a GPS module 440, a communication unit 450, a processing unit 460, and a storage unit 470, as shown in FIG. 10.

The operation unit 410 is achieved by a variety of switches, such as button switches, lever switches and dial switches, and an input device, such as a touch panel, and outputs an operation signal according to an operation input to the processing unit 460. The button switches 61 in FIG. 9 correspond to the operation unit 410.

The display unit 420 is achieved by a display device, such as an LCD (liquid crystal display) and EL display (electroluminescence display), and displays a variety of screens based on a display signal inputted from the processing unit 460. The display 62 in FIG. 9 corresponds to the display unit 420.

The IMU 33 includes the acceleration sensor 431, which measures acceleration in the local coordinate system, and the gyro sensor 433, which measures angular velocity in the local coordinate system. Each of the sensors 431 and 433 is, for example, a MEMS sensor using a MEMS (micro electro mechanical systems) technology.

The GPS module 440 receives a GPS satellite signal transmitted from a GPS satellite, which is a positioning satellite, with a GPS antenna 441, measures the position of the user 1 based on the received GPS satellite signal, and outputs the position of the user 1 to the processing unit 460 whenever necessary. Since the GPS module 440 is not an essential component, it is drawn with a broken line in FIG. 10.

The communication unit 450 is a communication device for wireless connection with an external apparatus over wireless communication. In the first example, the evaluation index values and the running data are transmitted via the communication unit 450 to the display apparatus 5 whenever necessary and displayed in the display section 53 (see FIG. 9). The user 1 can thus run while checking the evaluation index values and the running data at hand.

The processing unit 460 is achieved by a microprocessor, such as a CPU (central processing unit) and a DSP (digital signal processor), and a control device and a computation device, such as an ASIC (application specific integrated circuit) and includes a coordinate conversion section 461, which serves as an acquisition section, a landing timing detection section 462 and a takeoff timing detection section 463, which serve as a detection section, an evaluation index value calculation section 464, and a running data calculation section 465. Each of the sections that form the processing unit 460 may instead be formed of hardware, such as a dedicated module circuit.

The coordinate conversion section 461 performs predetermined coordinate conversion operation on measurement results from the IMU 33 to determine the travel object coordinate acceleration vector from the local coordinate acceleration vector.

The landing timing detection section 462 detects the landing timing based on the advance acceleration. The landing timing detection section 462 may instead detect the landing timing based on a change in the advance acceleration. On the other hand, the takeoff timing detection section 463 detects the takeoff timing based on at least one of the advance acceleration and the upward/downward acceleration. The takeoff timing detection section 463 may switch its detection mode between first takeoff timing detection and second takeoff timing detection in accordance with the running speed of the user 1. For example, the takeoff timing detection section 463 performs the first takeoff timing detection, in which the takeoff timing is detected based on a change in the advance acceleration and a change in the upward/downward acceleration, when the running speed of the user 1 is greater than or equal to a predetermined reference speed (5 [m/s], for example). The takeoff timing detection section 463 performs the second takeoff timing detection, in which the takeoff timing is detected based on a change in the upward/downward acceleration, when the running speed of the user 1 is smaller than the reference speed.

The evaluation index value calculation section 464 calculates the evaluation index values in the form of the on-ground duration, the in-air duration, and the on-ground-to-in-air duration ratio based on the landing timing detected by the landing timing detection section 462 and the takeoff timing detected by the takeoff timing detection section 463.

The running data calculation section 465 calculates the running data in the form of the running speed and the running distance of the user 1. Specifically, the running data calculation section 465 integrates travel object coordinate acceleration vectors corresponding over unit time to calculate a speed vector in the travel object coordinate system during the unit time to provide the current running speed. The running data calculation section 465 further multiplies the calculated running speed by the unit time to calculate the running distance during the unit time and adds the calculated running distance to the previously calculated running distance to provide the current running distance.

The storage unit 470 is achieved by any of a variety of IC (integrated circuit) memories, such as a ROM (read only memory), a flash ROM, and a RAM (random access memory), and a storage medium, such as a hard disk drive. The storage unit 470 stores in advance a program for operating the running information calculation apparatus 3 and achieving the variety of functions of the running information calculation apparatus 3, data used when the program is executed, and other types of information or temporarily stores them whenever a process is carried out.

Figure 12:
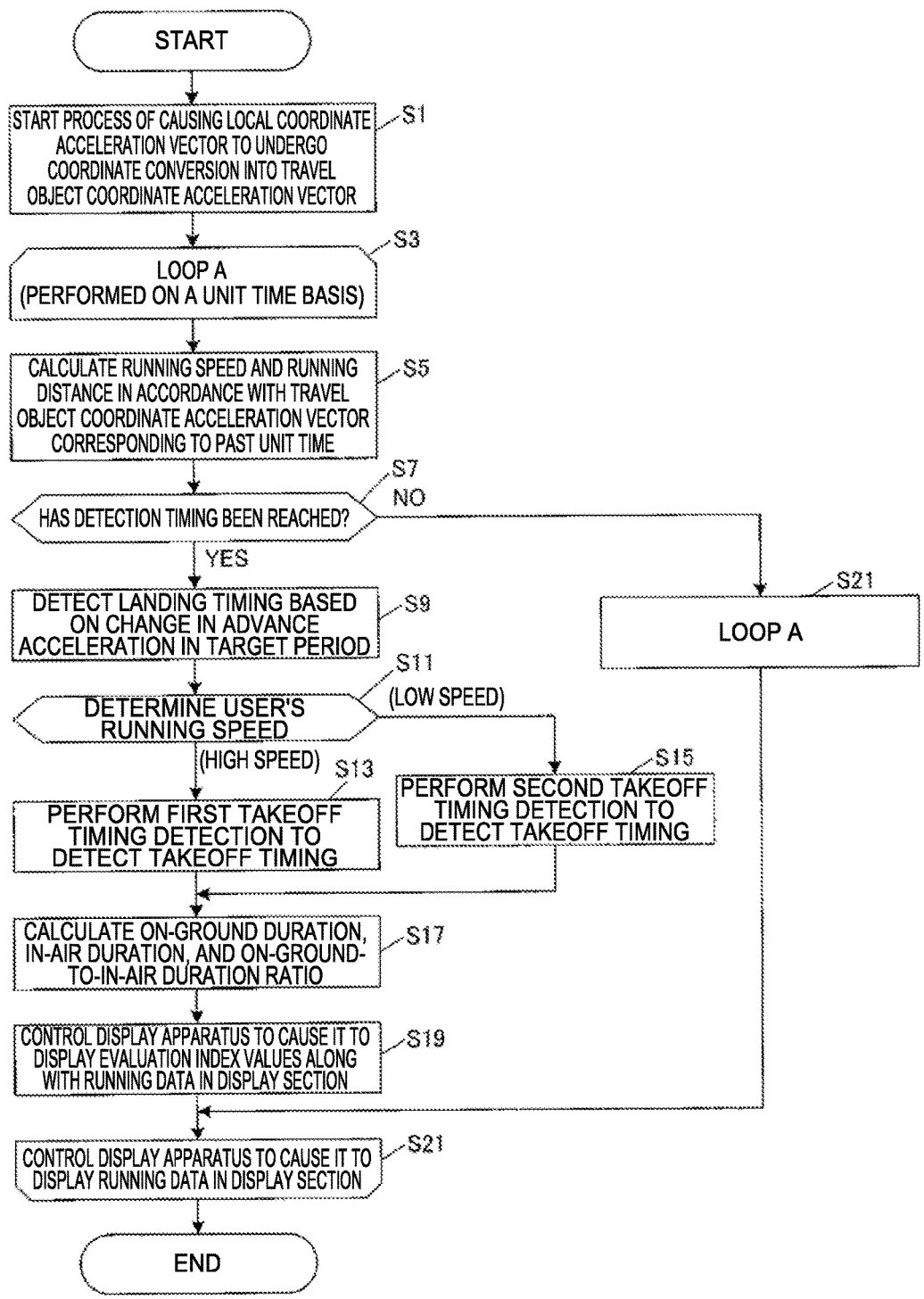
FIG. 12 is a flowchart showing the procedure of a running information calculation process in the first example of the second embodiment.

The storage unit 470 stores a running information calculation program 471, which causes the processing unit 460 to function as the coordinate conversion section 461, the landing timing detection section 462, the takeoff timing detection section 463, the evaluation index value calculation section 464, and the running data calculation section 465 to carry out a running information calculation process (see FIG. 12).

The storage unit 470 further stores travel object coordinate acceleration vector data 472, landing/takeoff data 473, and running data 474.

The travel object coordinate acceleration vector data 472 chronologically stores the travel object coordinate acceleration vector calculated by the coordinate conversion section 461 on a unit time basis. The travel object coordinate acceleration vector data 472 is formed, for example, of a ring buffer capable of holding travel object coordinate acceleration vectors corresponding to the latest past predetermined seconds. In the running information calculation process, the in-air duration in which a leg is separate from the ground is determined to be detection timing, and the nearest landing timing and takeoff timing are detected whenever the detection timing is reached.

The landing/takeoff data 473 chronologically stores the landing timing and the takeoff timing detected by the landing timing detection section 462 and the takeoff timing detection section 463 on a predetermined detecting timing basis and the evaluation index values calculated by the evaluation index value calculation portion 464 on a predetermined detecting timing basis. FIG. 11 shows an example of the data configuration of the landing/takeoff data 473 in the first example. The landing/takeoff data 473 is a data table in which the landing timing, the takeoff timing, and the evaluation index values formed of the on-ground duration, the in-air duration, and the on-ground-to-in-air duration ratio are related to each other, as shown in FIG. 11. The on-ground duration is assumed to be the duration from the landing timing to the takeoff timing corresponding to each other. On the other hand, the in-air duration is assumed, for example, to be the duration from previously detected takeoff timing to currently detected landing timing. For example, an in-air duration Td3 in a record D31 is calculated as the duration from takeoff timing Tb2 in a record D32, which is the previous takeoff timing, to landing timing Ta3 in the record D31.

The running data 474 chronologically stores the running speed and the running distance of the user 1 that are calculated by the running data calculation section 465 on a unit time basis.

Process Flow

FIG. 12 is a flowchart showing the procedure of the running information calculation process in the first example.

The process described below can be achieved by causing the processing unit 460 to read the running information calculation program 471 from the storage unit 470 and execute the read running information calculation program 471.

The running information calculation process starts, for example, when running start operation is performed via the operation unit 410. First, the following process is initiated: The coordinate conversion section 461 causes the local coordinate acceleration vector to undergo coordinate conversion into the travel object coordinate acceleration vector based on measurement results from the IMU 33 and accumulates and stores the converted travel object coordinate acceleration vector in the travel object coordinate acceleration vector data 472 (step S1). Thereafter, the processes in a loop A are repeatedly carried out on a unit time basis until running end operation is performed (step S3 to step S21).

In the loop A, the running data calculation section 465 first calculates the current running speed and running distance of the user 1 in accordance with the travel object coordinate acceleration vector corresponding to the unit time when the processes in the loop A were previously carried out (step S5).

The processing unit 460 subsequently evaluates whether or not the detection timing has been reached (step S7). The upward/downward acceleration of the user 1 who is running greatly changes by landing action and kicking action when a leg is in contact with the ground, whereas transitioning but maintained at a value close to a predetermined value ("0", for example) during an in-air duration, in which legs are separate from the ground. In step S7, when an in-air duration is detected, it is determined that the detection timing has been reached. For example, the processing unit 460 determines that the detection timing has been reached, based on a change in the upward/downward acceleration that occurs in the period from the previously determined detection timing to the current time, in a case where after the upward/downward acceleration has greatly changed, the current upward/downward acceleration transitions in such a way that it changes within a predetermined range around an acceleration value close to "0" (step S7: YES).

At the detection timing, the landing timing detection section 462 detects the landing timing based on a change in the advance acceleration in a target period from the previous detection timing to the current time (step S9). For example, the landing timing detection section 462 detects local extremes based on a change in the advance acceleration in the target period and sets the time when the advance acceleration is locally maximized immediately before a first local minimum to be the landing timing.

The takeoff timing detection section 463 subsequently determines whether the running speed of the user 1 calculated in step S5 has a large value or a small value (step S11). The takeoff timing detection section 463 then determines that the running speed has a large value when it is greater than or equal to the reference speed, and the control proceeds to step S13, where the first takeoff timing detection is performed. In the first takeoff timing detection, the takeoff timing detection section 463 first identifies time when the advance acceleration becomes smaller than the upward/downward acceleration based on the change in the advance acceleration and a change in the upward/downward acceleration in the target period. Based on the change in the advance acceleration, a local minimum that occurs immediately after the identified time is detected, and the detected time is set to be the takeoff timing.

On the other hand, the takeoff timing detection section 463 determines that the running speed has a small value when it is smaller than the reference speed, and the control proceeds to step S15, where the second takeoff timing detection is performed. In the second takeoff timing detection, the takeoff timing detection section 463 detects time when the upward/downward acceleration becomes greater than the predetermined value of "0" based on a change in the upward/downward acceleration after the time having been set to be the landing timing in step S9 as the takeoff timing.

The evaluation index value calculation section 464 subsequently calculates the on-ground duration, the in-air duration, and the on-ground-to-in-air duration ratio (step S17).

The processing unit 460 then controls the display apparatus 5 to cause it to display the evaluation index values calculated in step S17 along with the running data calculated in step S5 in the display section 53 (step S19). When the evaluation result in step S7 shows that the detection timing has not been reached (step S7: NO), the processing unit 460 controls the display apparatus 5 to cause it to display the running data calculated in step S5 in the display section 53 (step S21). The display process is carried out by transmitting the evaluation index values and the running data in step S19 but the running data in step S21 via the communication unit 450 to the display apparatus 5 and causing the display apparatus 5 having received the evaluation index values and the running data to display them in the display section 53. How to display the evaluation index values and the running data is not limited to a specific way, and the latest values may be displayed, or time-course changes since the running started may be displayed. The processes in a single loop A are completed as described above.

Figure 13:
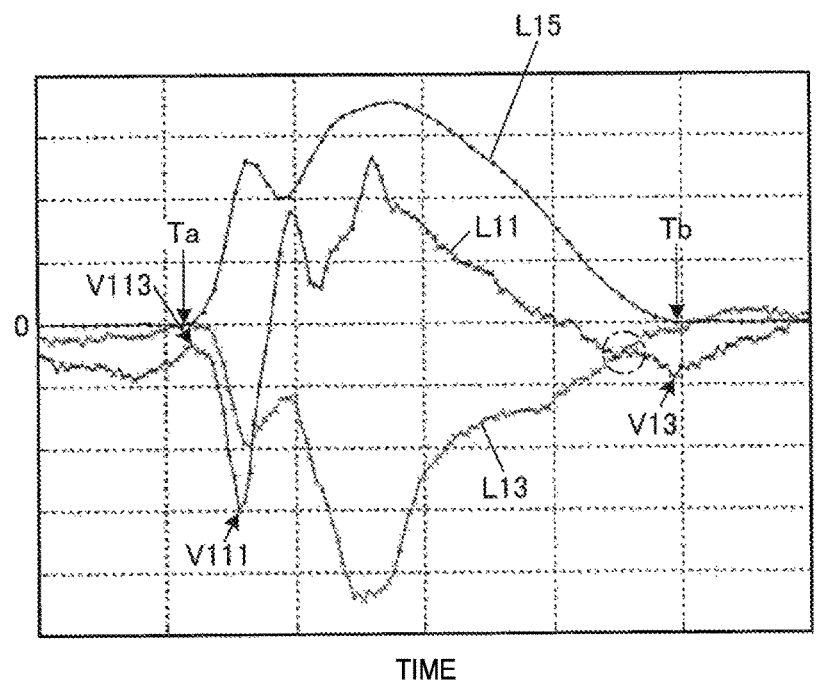
FIG. 13 shows detection results of the landing timing and the takeoff timing in a case where a user runs at a high speed.

The user 1 was actually allowed to run with the running information calculation apparatus 3 attached thereto, and measurement using a floor reaction force meter was performed for verification of detection results of the landing timing and the takeoff timing detected by the running information calculation apparatus 3. FIG. 13 shows detection results of the landing timing and the takeoff timing in a case where the user 1 runs at a high speed (at least 5 [m/s], for example). FIG. 13 shows a change L11 in the advance acceleration, a change L13 in the upward/downward acceleration, and a change L15 in the floor reaction force in a target period referred to when a certain pair of landing timing and takeoff timing are detected. Landing timing Ta is the time when the floor reaction force starts increasing from zero, and takeoff timing Tb is the time when the floor reaction force having increased decreases to zero.

As described above, the landing timing detection section 462 detects a local maximum V113 immediately before a first local minimum V111 from the change L11 in the advance acceleration in the target period and sets the detected time to be the landing timing. The thus detected landing timing coincides well with the landing timing Ta shown in the change L15 in the floor reaction force.

The takeoff timing detection section 463 performs the first takeoff timing detection when the user 1 runs at a high speed and first identifies time encircled with a dashed line in FIG. 13 and indicating when the advance acceleration becomes smaller than the upward/downward acceleration. A local minimum V13 immediately after the identified time is then detected and sets the detected time to be the takeoff timing. The thus detected takeoff timing also coincides well with the takeoff timing Tb shown in the change L15 in the floor reaction force.

Figure 14:
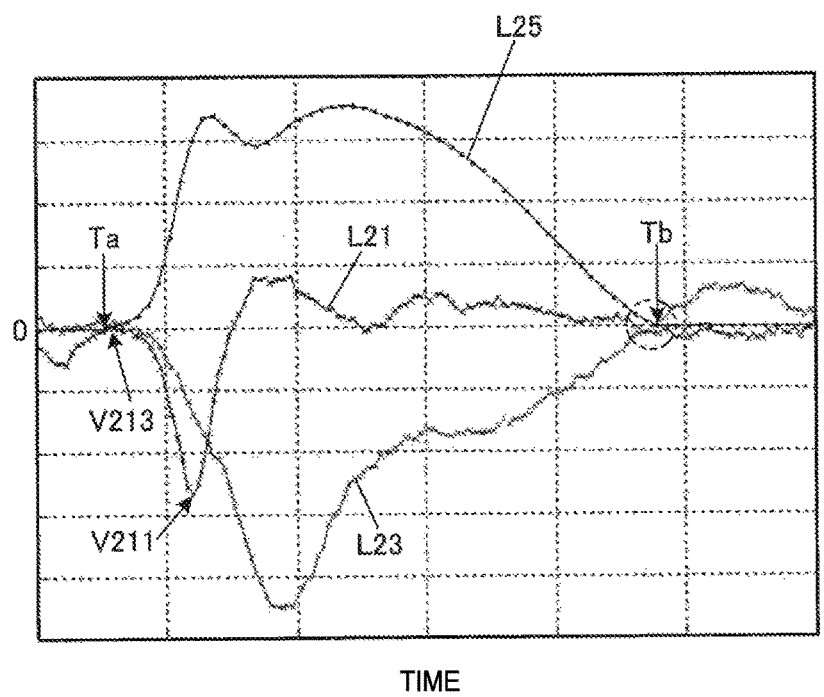
FIG. 14 shows detection results of the landing timing and the takeoff timing in a case where a user runs at a low speed.

On the other hand, FIG. 14 shows detection results of the landing timing and the takeoff timing in a case where the user 1 runs at a low speed (3.5 [m/s], which is smaller than 5 [m/s], for example). FIG. 14 shows a change L21 in the advance acceleration, a change L23 in the upward/downward acceleration, and a change L25 in the floor reaction force in a target period referred to when a certain pair of landing timing and takeoff timing are detected.

As in the case where the user 1 runs at a high speed, the landing timing detection section 462 detects a local maximum V213 immediately before a first local minimum V211 from the change L21 in the advance acceleration in the target period and sets the detected time to be the landing timing. The thus detected landing timing coincides well with landing timing Ta shown in the change L25 in the floor reaction force.

The takeoff timing detection section 463 performs the second takeoff timing detection when the user 1 runs at a low speed. The takeoff timing detection section 463 then detects time encircled with a chain double-dashed line in FIG. 14 and indicating when the upward/downward acceleration becomes greater than or equal to the predetermined value of "0" as the takeoff timing from the change L23 in the upward/downward acceleration after the time when the local maximum V213 is detected and set to be the landing timing. The thus detected takeoff timing also coincides well with the takeoff timing Tb shown in the change L25 in the floor reaction force.

As described above, according to the first example, the landing timing and the takeoff timing of the user 1 who is running can be detected with high precision. Further, since the on-ground duration, the in-air duration, and the on-ground-to-in-air duration ratio can be calculated from the detected landing timing and takeoff timing, these values can be determined with precision and presented to the user 1. The user 1 can therefore run while making use of the on-ground duration, the in-air duration, and the on-ground-to-in-air duration ratio for improvement in the running form or otherwise being aware of the user's own motion state.

Second Example

A second example of the second embodiment will next be described. The same portions as those in the first example have the same reference characters.

Figure 15:
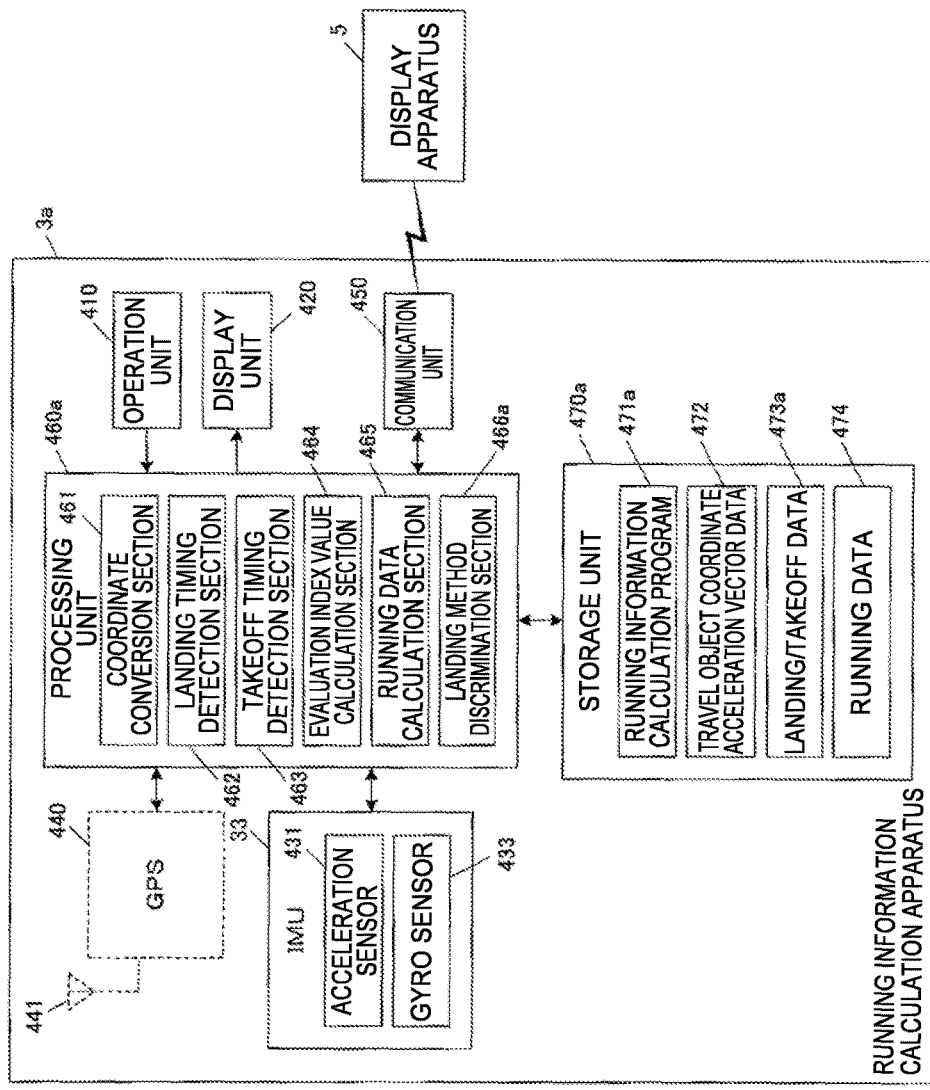
FIG. 15 is a block diagram showing an example of the functional configuration of a running information calculation apparatus in a second example of the second embodiment.

FIG. 15 is a block diagram showing an example of the functional configuration of a running information calculation apparatus 3a in the second example of the second embodiment. The running information calculation apparatus 3a includes the operation unit 410, the display unit 420, the IMU 33, the GPS module 440, the communication unit 450, a processing unit 460a, and a storage unit 470a, as shown in FIG. 15.

In the second example, the processing unit 460a includes the coordinate conversion section 461, the landing timing detection section 462, the takeoff timing detection section 463, the evaluation index value calculation section 464, the running data calculation section 465, and a landing method discrimination section 466a. The landing method discrimination section 466a discriminates, based on a change in the upward/downward acceleration, between "toe landing," in which a portion close to the toe lands on the ground, and "heel landing," in which the heel lands on the ground, as a method for landing on the ground (landing method).

The storage unit 470a stores a running information calculation program 471a, the travel object coordinate acceleration vector data 472, landing/takeoff data 473a, and the running data 474. The running information calculation program 471a is a program that causes the processing unit 460a to function as the coordinate conversion section 461, the landing timing detection section 462, the takeoff timing detection section 463, the evaluation index value calculation section 464, the running data calculation section 465, and the landing method discrimination section 466a to carry out a running information calculation process (see FIG. 16). The landing/takeoff data 473a chronologically stores not only the landing timing, the takeoff timing and the evaluation index values having been described with reference to the landing/takeoff data 473 shown in FIG. 11 but also the landing method discriminated by the landing method discrimination section 466a and related to the values described above.

Process Flow

Figure 16:
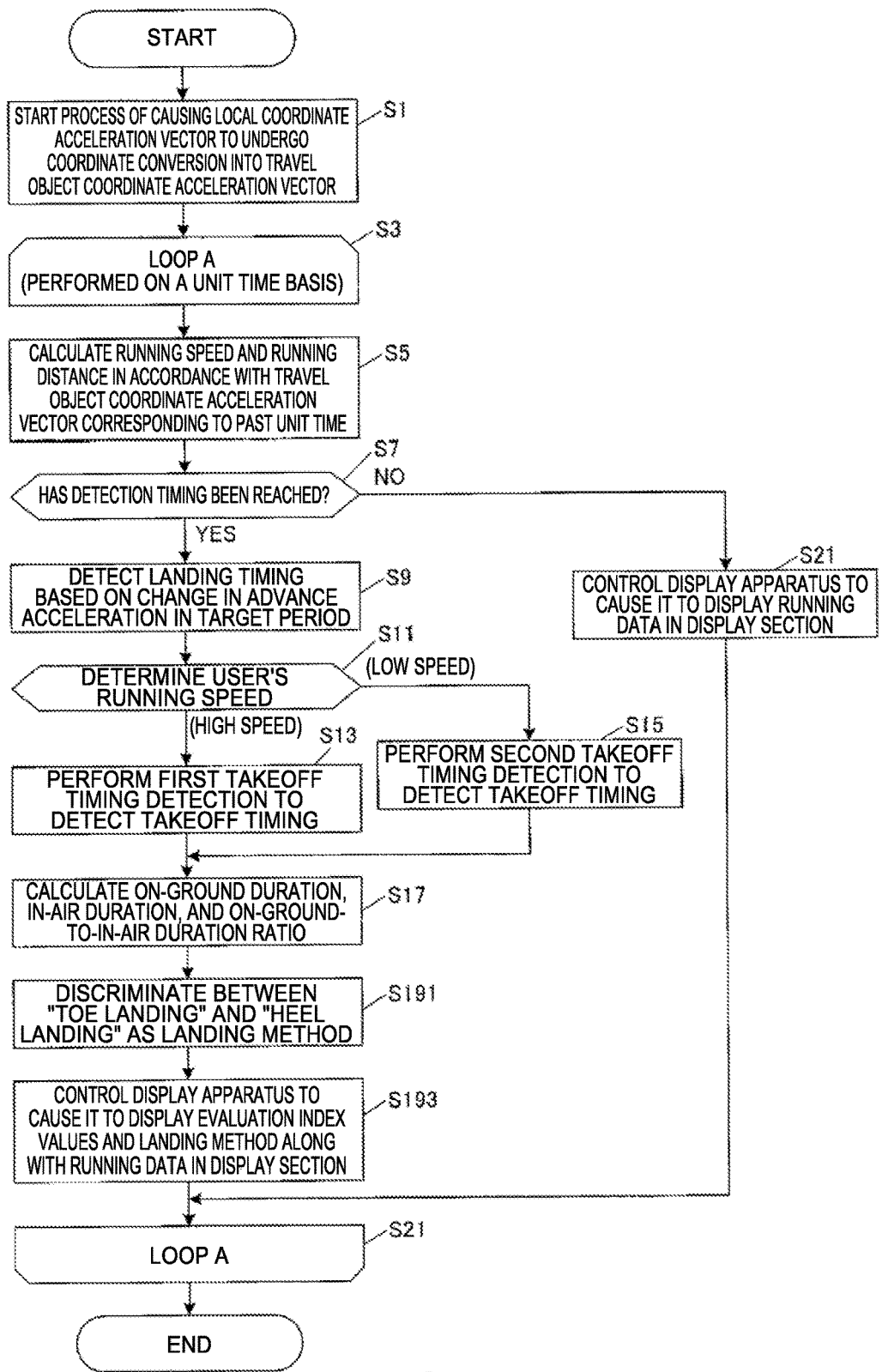
FIG. 16 is a flowchart showing the procedure of a running information calculation process in the second example of the second embodiment.

FIG. 16 is a flowchart showing the procedure of the running information calculation process in the second example. The process described below can be achieved by causing the processing unit 460a to read the running information calculation program 471a from the storage unit 470a and execute the read running information calculation program 471a.

In the running information calculation process in the second example, after step S17, the landing method discrimination section 466a discriminates between the "toe landing" and the "heel landing" as the landing method based on a change in the upward/downward acceleration in a target period (step S191).

Figure 17A:
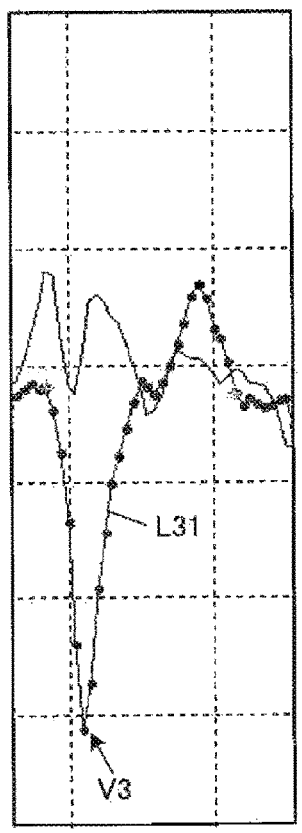
FIG. 17A shows a change in upward/downward acceleration in a case where a landing method is "toe landing.
Figure 17B:
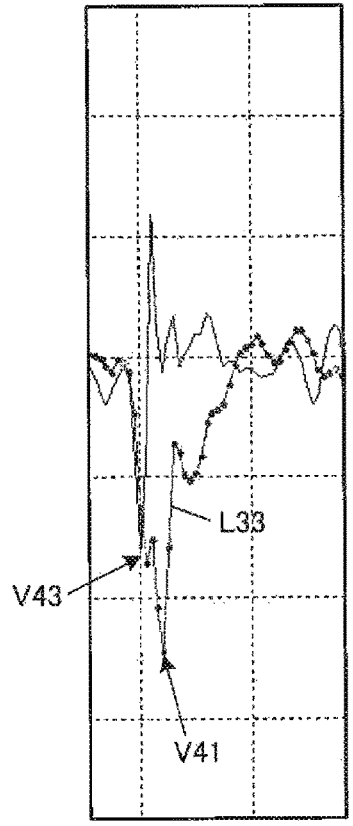
" and FIG. 17B shows a change in the upward/downward acceleration in a case where the landing method is "heel landing."

In recent studies, a paper stating that the "toe landing" is a less risky landing method than the "heel landing" in terms of injury and other accidents has been published, and the landing method during running motion has therefore attracted attention. FIG. 17A shows a change L31 in the upward/downward acceleration in a case where the "toe landing" is performed in a target period referred to when a certain pair of landing timing and takeoff timing are detected. FIG. 17B shows a change L33 in the upward/downward acceleration in a case where the "heel landing" is performed in the target period. When the "toe landing" is performed, no local extreme is present before a local minimum V3, which is also a minimum, in the change L32 in the upward/downward acceleration that occurs in response to a pair of landing and takeoff, and the change in which the value of the upward/downward acceleration decreases from the predetermined value of "0" and increases to "0" again has a unimodal waveform, as shown in FIG. 17A. In contrast, when the "heel landing" shown in FIG. 17B is performed, a local extreme V43 is present before a local minimum V4, and the change in which the value of the upward/downward acceleration decreases from "0" and increases to "0" again has a multimodal waveform.

In step S191 in FIG. 16, the landing method discrimination section 466a determines that the landing method is the "toe landing" when the change in which the value of the upward/downward acceleration in a target period decreases from the predetermined value of "0" and increases to "0" again has a unimodal waveform, whereas determining that the landing method is the "heel landing" when the change has a multimodal waveform.

The processing unit 460a then controls the display apparatus 5 to cause it to display the landing method determined in step S191 along with the running data calculated in step S5 and the evaluation index values calculated in step S17 in the display section 53 (step S193).

As described above, the second example can provide the same advantageous effect as that provided by the first example and can further discriminate between the "toe landing" and the "heel landing" as the landing method and present an evaluation result to the user 1.

Figure 18:
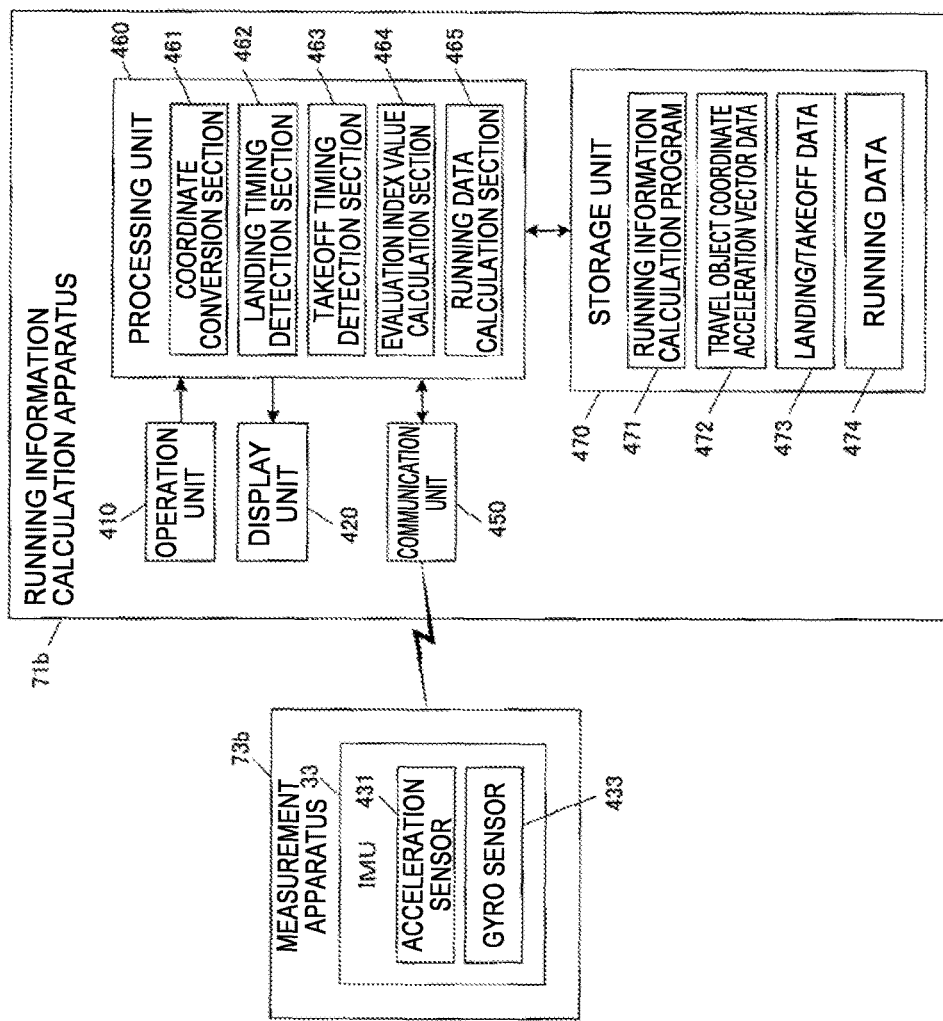
FIG. 18 is a block diagram showing an example of the functional configuration of a running information calculation apparatus in a variation of the second embodiment.

The configuration of the running information calculation system described in the above second embodiment is presented by way of example and may be changed as appropriate. FIG. 18 is a block diagram showing an example of the configuration of a running information calculation system in a variation of the second embodiment. In FIG. 18, the same portions as those in the first example have the same reference characters.

The running information calculation system in the present variation is formed of a running information calculation apparatus 71b and a measurement apparatus 73b. The running information calculation apparatus 71b is attached to an arm (right arm or left arm) of the user 1, and the measurement apparatus 73b, which is an apparatus separate from the running information calculation apparatus 71b, is attached to a body portion (right waist or left waist, for example) of the user 1 when the apparatus are used.

The measurement apparatus 73b accommodates the IMU 33, which includes the acceleration sensor 431 and the gyro sensor 433. The measurement apparatus 73b is configured to be capable of transmitting and receiving data to and from the running information calculation apparatus 71b over wireless communication and transmits measurement results from the IMU 33 to the running information calculation apparatus 71b whenever necessary.

On the other hand, the running information calculation apparatus 71b includes the operation unit 410, the display unit 420, the communication unit 450, the processing unit 460, and the storage unit 470, as the running information calculation apparatus 3 in the first example does. The processing unit 460 includes the coordinate conversion section 461, the landing timing detection section 462, the takeoff timing detection section 463, the evaluation index value calculation section 464, and the running data calculation section 465. The storage unit 470 stores the running information calculation program 471, the travel object coordinate acceleration vector data 472, the landing/takeoff data 473, and the running data 474. The processing unit 460 may further include the landing method discrimination section 466a, as in the second example, and landing/takeoff data 473a may be stored in the storage unit 470 in place of the landing/takeoff data 473.

Further, a stride, an on-ground distance, an in-air distance, and other parameters may be calculated as the evaluation index values as well as the on-ground duration, the in-air duration, and the on-ground-to-in-air duration ratio presented by way of example in the second embodiment described above and may be displayed in the display section 53. The stride is calculated, for example, as the running distance of the user 1 from the previous takeoff timing to the current takeoff timing. The on-ground distance is calculated, for example, as the running distance of the user 1 from the current landing timing to the current takeoff timing. The in-air distance is calculated, for example, as the running distance of the user 1 from the previous takeoff timing to the current landing timing. The in-air distance may instead be determined by subtracting the on-ground distance from the stride.

Irrespective of the running speed of the user 1, the first takeoff timing detection and the second takeoff timing detection may both be performed. When the difference between an on-ground duration determined from a result of the first takeoff timing detection and an on-ground duration determined from a result of the second takeoff timing detection is sufficiently small (when the absolute value of the difference is smaller than 0.02 [sec], for example), the on-ground durations may be averaged to calculate a final on-ground duration, which may then be displayed in the display section 53.

In the second embodiment described above, the running speed and the running distance of the user 1 are calculated as the running data whenever necessary and displayed in the display section 53. Further, the position of the user 1 may be calculated as the running data and displayed in the display section 53. For example, inertial navigation may be used to autonomously measure the position of the user 1, which may be displayed as the running data. In this case, measurement results from the IMU 33 are used to carry out a known inertial navigation computation process to calculate the position of the user 1 whenever necessary in an absolute coordinate system defined, for example, as the ECEF (earth center earth fixed) coordinate system. When the running information calculation apparatus 3 or any other running information calculation apparatus includes the GPS module 440 indicated with the broken line in FIG. 10, a measurement result from the GPS module 440 may be used as the position of the user 1 and displayed as part of the running data.

When the running information calculation apparatus 3 or any other running information calculation apparatus includes the GPS module 440, a measurement result therefrom can be used to calculate the on-ground distance and the in-air distance. That is, based on a measurement result from the GPS module 440 at the landing timing and the takeoff timing, the on-ground distance and the in-air distance may be calculated from the positions of the user 1 at the landing timing and the takeoff timing.

3. Third Embodiment

The running motion evaluation method and the running motion evaluation apparatus according to an embodiment of the invention will be described below with reference to the drawings. In the third embodiment, a running motion evaluation system in which the running motion evaluation apparatus is incorporated will be presented by way of example. It is noted that the third embodiment, which will be described below, does not limit the running motion evaluation method or the running motion evaluation apparatus according to other embodiments of the invention, and that a form to which the running motion evaluation method and the running motion evaluation apparatus according to an embodiment of the invention can be used is limited to the third embodiment. Further, the same portions have the same reference characters in the illustration of the drawings.

First Example

Figure 19:
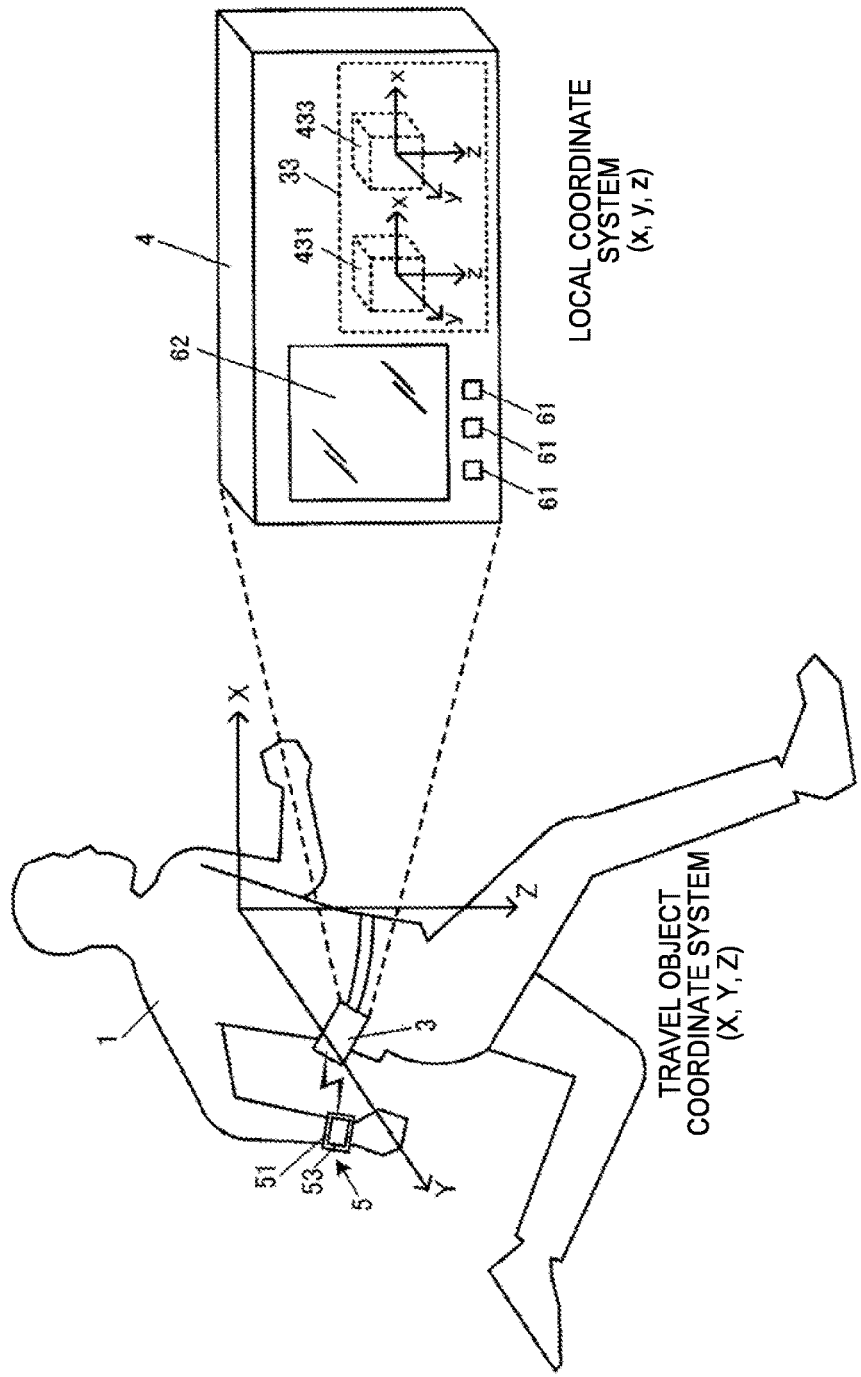
FIG. 19 is a diagrammatic view showing an example of the overall configuration of a running motion evaluation system in a first example of a third embodiment.

A first example of the third embodiment will first be described. FIG. 19 is a diagrammatic view showing an example of the overall configuration of a running motion evaluation system including a running motion evaluation apparatus 4 in the first example of the third embodiment. The running motion evaluation apparatus 4 is a compact electronic apparatus used by the user 1 who is running and carried, along with a display apparatus 5, which is a separate apparatus, by the user 1. The running motion evaluation apparatus 4 and the display apparatus 5 are so configured that they can transmit and receive data to and from each other over wireless communication. For example, the running motion evaluation apparatus 4 is attached to a body portion (right waist or left waist, for example) of the user 1, and the display apparatus 5 is attached to an arm (right arm or left arm) of the user 1, as shown in FIG. 19.

The running motion evaluation apparatus 4 includes button switches 61 and a display 62 as appropriate, which are disposed, for example, on the front surface of an enclosure, and accommodates an IMU 33, which is known as an inertial measurement unit. The IMU 33 is a sensor unit including an acceleration sensor 431 and a gyro sensor 433 and detects acceleration and angular velocity along and around each axis of a local coordinate system (sensor coordinate system) that is a common three-dimensional orthogonal coordinate system related to the sensors 431 and 433. The three axes of the local coordinate system are called an x axis, a y axis, and a z axis.

The running motion evaluation apparatus 4 causes an acceleration vector (local coordinate acceleration vector) measured with the acceleration sensor 431 in the local coordinate system to undergo coordinate conversion into a vector in the travel object coordinate system that is a three-dimensional orthogonal coordinate system related to the user 1 to calculate a travel object coordinate acceleration vector. The travel object coordinate system is, for example, a coordinate system defined by a frontward/rearward direction (advance direction) the positive side of which coincides with the front side of the user 1, a rightward/leftward direction the positive side of which coincides with the right side of the user 1, and the gravity direction (upward/downward direction) the positive side of which coincides with the vertically lower side. In the travel object coordinate system, the advance direction is called an X axis, the rightward/leftward direction is called a Y axis, and the upward/downward direction is called a Z axis.

In an actual process, the direction of the acceleration vector detected with the acceleration sensor 431 in a state in which the user 1 has not yet started running but is stationary (gravity direction) is assumed to be an upward/downward direction. Further, the direction of the acceleration vector detected when the user 1 starts running and takes a footstep forward from the stationary state is assumed to be an advance direction. The direction perpendicular to the upward/downward direction and the advance direction is defined as a rightward/leftward direction, and a coordinate conversion matrix used to convert the local coordinate system into the travel object coordinate system is determined for coordinate conversion. A known technology is applicable to the coordinate conversion itself and will not therefore be described. Further, after an initial coordinate conversion matrix is determined, the coordinate conversion matrix is corrected whenever necessary based on a detection result from the gyro sensor 433 to allow the travel object coordinate system to follow the advance direction of the user 1.

The running motion evaluation apparatus 4 then integrates the travel object coordinate acceleration vector to calculate a speed vector (travel object coordinate speed vector) so as to determine the travel speed (running speed) of the user 1, causes the travel object coordinate speed vector to undergo a concatenation process to determine the distance traveled since the user 1 started running (running distance), and transmits the determined values to the display apparatus 5. The term "integrate" means accumulative addition of a value corresponding to predetermined unit time. The term "concatenation" means addition of a result obtained by the integration to a latest calculated result. The travel speed (running speed) and the travel distance (running distance) are examples of running data.

Additionally, as information on the position of the user 1 who is running in a side view (side view of user 1), the running motion evaluation apparatus 4 detects the position of the user 1 in the upward/downward direction (Z-axis direction) with respect to the advance direction (X-axis direction) (side-view position). The running motion evaluation apparatus 4 then detects the advance acceleration contained in the travel object coordinate acceleration vector (X-axis component of travel object coordinate acceleration vector) as advance acceleration, uses the advance acceleration and motion course information representing the trajectory of the side-view position described above to calculate a propulsion efficiency angle as a propulsion efficiency index value, and transmits the propulsion efficiency angle to the display apparatus 5.

The display apparatus 5 is a wristwatch-type electronic apparatus that receives and displays the propulsion efficiency angle and the running data transmitted from the running motion evaluation apparatus 4 and includes a display section 53 disposed on the front surface of a body case 51 (surface oriented outward when the display apparatus 5 is attached to the user). Although not shown, the display apparatus 5 further includes button switches and a loudspeaker disposed at appropriate locations of the body case 51, a touch panel integrally formed with a display screen of the display section 53, and other components as appropriate.

Functional Configuration

Figure 20:
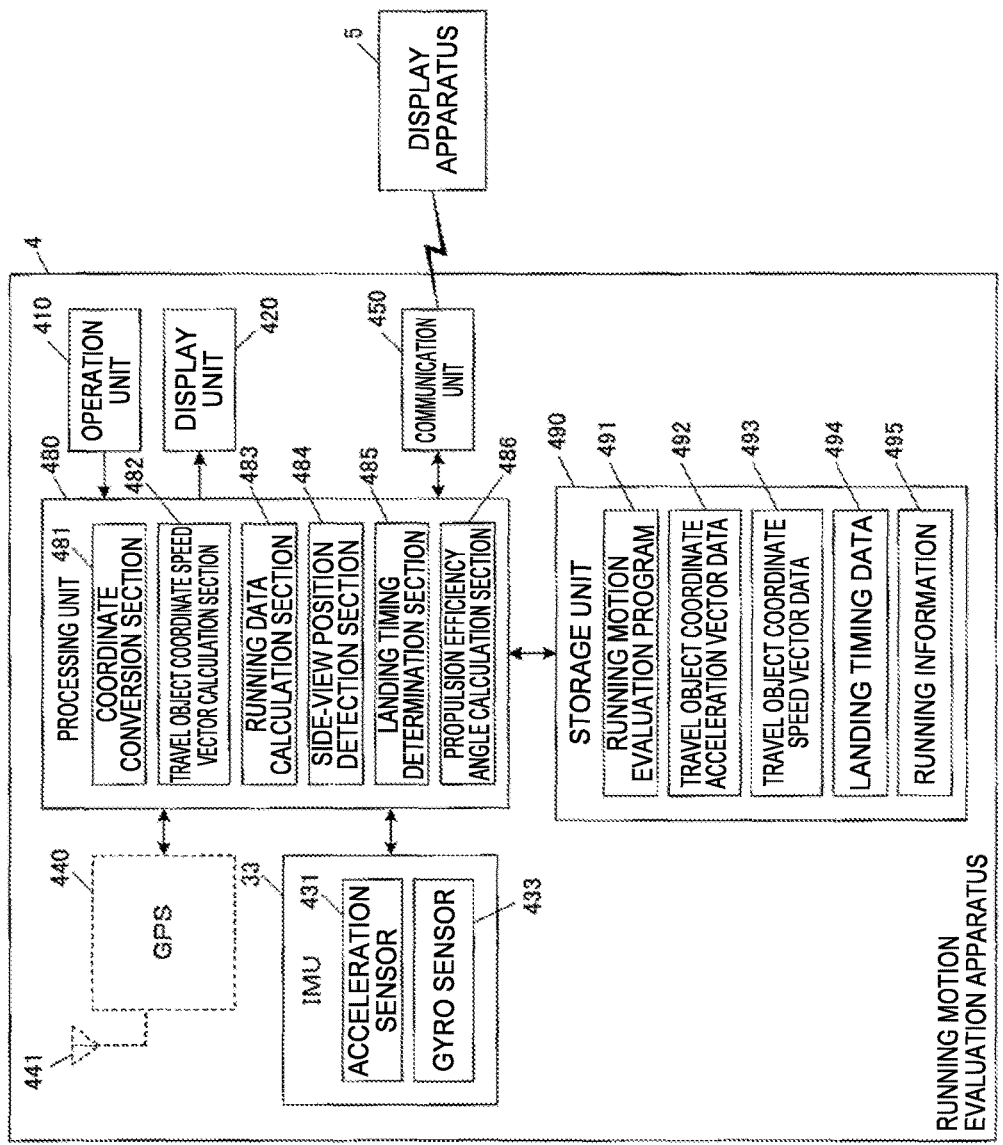
FIG. 20 is a block diagram showing an example of the functional configuration of a running motion evaluation apparatus in the first example of the third embodiment.

FIG. 20 is a block diagram showing an example of the functional configuration of the running motion evaluation apparatus 4 in the first example. The running motion evaluation apparatus 4 includes an operation unit 410, a display unit 420, the IMU 33, a GPS module 440, a communication unit 450, a processing unit 480, which serves as a detection section and a calculation section, and a storage unit 490, as shown in FIG. 20.

The operation unit 410 is achieved by a variety of switches, such as button switches, lever switches, and dial switches, an input device, such as a touch panel, and outputs an operation signal according to an operation input to the processing unit 480. The button switches 61 in FIG. 20 correspond to the operation unit 410.

The display unit 420 is achieved by a display device, such as an LCD (liquid crystal display) and EL display (electroluminescence display), and displays a variety of screens based on a display signal inputted from the processing unit 480. The display 62 in FIG. 20 corresponds to the display unit 420.

The IMU 33 includes the acceleration sensor 431, which measures acceleration in the local coordinate system, and the gyro sensor 433, which measures angular velocity in the local coordinate system. Each of the sensors 431 and 433 is, for example, a MEMS sensor using a MEMS (micro electro mechanical systems) technology.

The GPS module 440 receives a GPS satellite signal transmitted from a GPS satellite, which is a positioning satellite, with a GPS antenna 441, measures the position of the user 1 based on the received GPS satellite signal, and outputs the position of the user 1 to the processing unit 480 whenever necessary. Since the GPS module 440 is not an essential component, it is drawn with a broken line in FIG. 20.

The communication unit 450 is a communication device for wireless connection with an external apparatus over wireless communication. In the first example, the propulsion efficiency angle and the running data are transmitted via the communication unit 450 to the display apparatus 5 whenever necessary and displayed in the display section 53 (see FIG. 19). The user 1 can thus run while checking the propulsion efficiency angle and the running data at hand.

The processing unit 480 is achieved by a microprocessor, such as a CPU (central processing unit) and a DSP (digital signal processor), and a control device and a computation device, such as an ASIC (application specific integrated circuit) and includes a coordinate conversion section 481, a travel object coordinate speed vector calculation section 482, a running data calculation section 483, a side-view position detection section 484, a landing timing determination section 485, and a propulsion efficiency angle calculation section 486. Each of the sections that form the processing unit 480 may instead be formed of hardware, such as a dedicated module circuit.

The coordinate conversion section 481 performs predetermined coordinate conversion operation on measurement results from the IMU 33 to cause a local coordinate acceleration vector to undergo coordinate conversion into a travel object coordinate acceleration vector.

The travel object coordinate speed vector calculation section 482 integrates travel object coordinate acceleration vectors corresponding to unit time to calculate a change in the speed vector during the unit time in the travel object coordinate system. The travel object coordinate speed vector calculation section 482 then concatenates the calculated change in the speed vector with a previously calculated travel object coordinate speed vector to calculate the travel object coordinate speed vector on a unit time basis.

The running data calculation section 483 calculates the running speed and the running distance of the user 1 as the running data. Specifically, the running data calculation section 483 produces the current running speed based on the travel object coordinate speed vector calculated by the travel object coordinate speed vector calculation section 482. The running data calculation section 483 further adds the amount of travel (scalar quantity) corresponding to the change in the speed vector calculated by the travel object coordinate speed vector calculation section 482 to a previously calculated running distance to produce the current running distance.

The side-view position detection section 484 detects the side-view position of the user 1. Specifically, the side-view position detection section 484 uses a running start position as a base point, adds the amount of travel in the advance direction corresponding to the change in the speed vector calculated by the travel object coordinate speed vector calculation section 482 in the advance direction to a previously calculated advance position, and adds the amount of travel in the upward/downward direction corresponding to a change in the speed vector in the upward/downward direction to a previously calculated upward/downward position to detect the side-view position.

The landing timing determination section 485 sets the period from previously determined landing timing to the current time to be a target period and determines the landing timing based on a change in the advance acceleration in the target period whenever predetermined evaluation timing is reached. A method for determining the landing timing is not limited to a specific method. For example, a local extreme is detected from a change in the advance acceleration in the target period, and the time when the advance acceleration is locally maximized immediately before a first local minimum is set to be the landing timing. The upward/downward acceleration can, of course, be used to determine the landing timing instead of the advance acceleration.

The propulsion efficiency angle calculation section 486 sets the side-view position at the landing timing determined by the landing timing determination section 485 to be a landing point and uses the trajectory of the side-view position between the thus set landing point and a previous landing point to calculate the propulsion efficiency angle. Two calculation methods are presented below by way of example as a method for calculating the propulsion efficiency angle in the first example.

First Calculation Method

Figure 21:
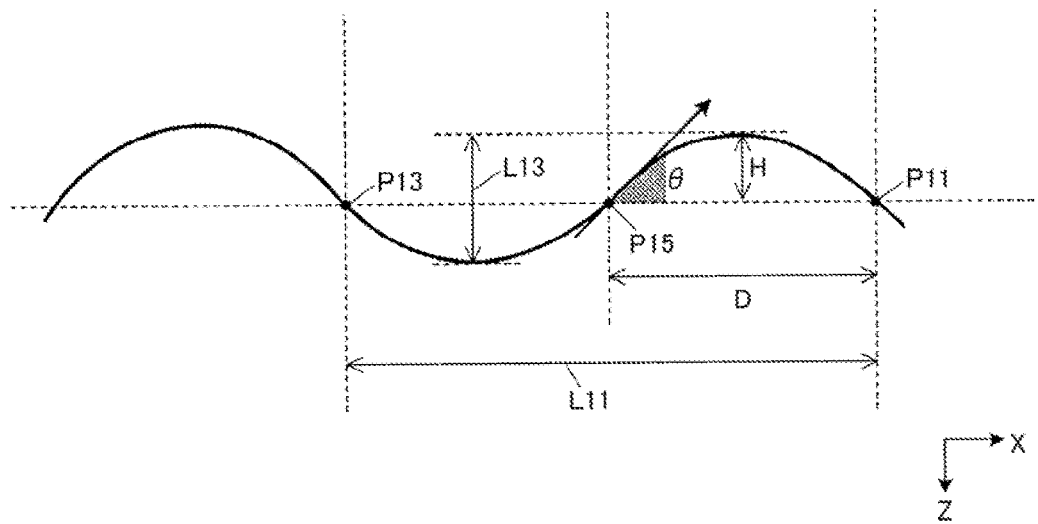
FIG. 21 describes the principle of a first calculation method in accordance with which a propulsion efficiency angle is calculated.

FIG. 21 describes the principle of a first calculation method in accordance with which the propulsion efficiency angle is calculated. FIG. 21 shows an example of the trajectory of the side-view position with the horizontal direction being the advance direction and the vertical direction being the upward/downward direction. The position in the upward/downward direction respect to the advance direction (side-view position) of the user 1 who is running periodically changes in response to repetition of landing action and kicking action. Look at the trajectory of the side-view position in the in-air duration from the kicking action to the landing action, and one can assume that the trajectory follows parabolic motion because external force hardly acts during the in-air duration. The position of the user 1 is a position of a portion to which the running motion evaluation apparatus 4 is attached (body portion).

As described above, the propulsion efficiency, which is an index according to which the motion state of the user 1 who is running is evaluated, is improved by reducing the amount of upward/downward movement of the body during the running motion. The greater the amount of jump in the upward direction in the kicking action, the greater the amount of subduction of the body after the landing due to the rebound of the jump accordingly. In other words, reducing the amount of jump in the kicking action allows propulsive force that moves the body in the advance direction to be readily produced, whereby the propulsion efficiency is improved. It can be said that the angle of the jump with respect to the advance direction in the kicking action (kicking angle) reflects well how well propulsive force is produced in the advance direction, that is, the propulsion efficiency. A problem here is a difficulty in determination of the kicking (takeoff) timing as compared with the determination of the landing timing.

To overcome the difficulty, an intermediate point P15 between a currently determined landing point P11 and a previous landing point P13 in the advance direction is estimated to be a current kicking point, and the trajectory of the side-view position from the kicking point P15 to the landing point P11 is assumed to follow parabolic motion as shown in FIG. 21. Under this condition, a propulsion efficiency angle θ is calculated in the form of the kicking angle.

In an actual process, the trajectory of the side-view position between the landing points P13 and P11 is first used to calculate the advance travel distance of the user 1 in response to the current landing action and kicking action. For example, a length equal to one-half the distance L11 between the landing points P13 and P11 in the advance direction is determined and set to be an advance travel distance D. The upward/downward travel distance of the user 1 resulting from the landing action and the kicking action is then calculated. For example, a length equal to one-half the upward/downward amplitude L13 of the side-view position between the landing points P13 and P11 is determined and set to be an upward/downward travel distance H.

The propulsion efficiency angle θ is then calculated at the estimated kicking point P15 in accordance with Expression (2), which is a variation of a typical expression of parabolic motion expressed by Expression (1).

$$H = \frac{v_0^2 \sin^2\theta}{2g}, X = \frac{v_0^2 \sin 2\theta}{g} \quad (1)$$

$$\theta = \arcsin\left(\sqrt{\frac{16H^2}{X^2 + 16H^2}}\right) \quad (2)$$

Second Calculation Method

Figure 22:
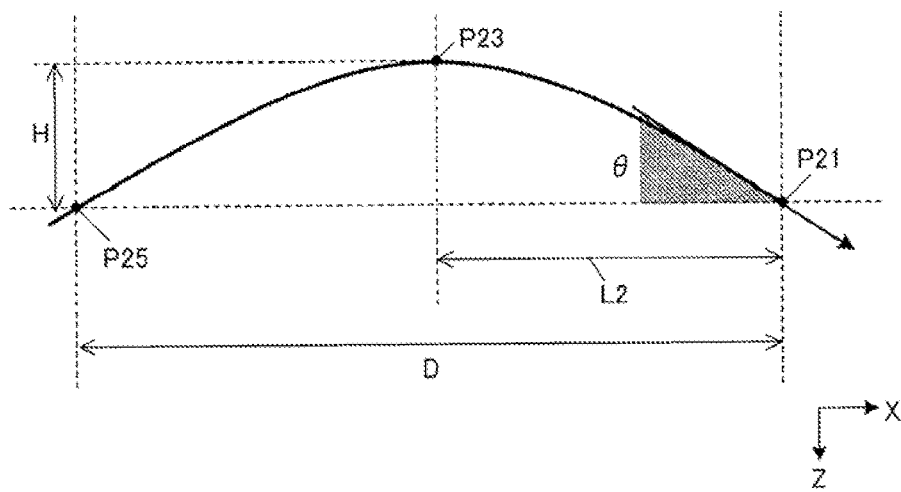
FIG. 22 describes the principle of a second calculation method in accordance with which the propulsion efficiency angle is calculated.

FIG. 22 describes the principle of a second calculation method in accordance with which the propulsion efficiency angle is calculated. FIG. 22 shows an example of the trajectory of the side-view position with the horizontal direction being the advance direction and the vertical direction being the upward/downward direction. In the second calculation method, it is assumed that the trajectory of the side-view position in the in-air duration from the kicking action to the landing follows parabolic motion, and the propulsion efficiency angle θ is calculated in the form of landing angle. The reason for this is that when the trajectory of the side-view position in the in-air duration is assumed to follow parabolic motion, the landing angle is considered to be equal to the kicking angle.

In an actual process, a highest point reaching timing when the upward/downward position is maximized immediately before a landing point P21 is determined, and a side-view position P23 at the highest point reaching timing (highest point) is assumed to be the vertex of the parabolic motion, as shown in FIG. 22. The kicking point is estimated to be a point P25 on the opposite side of the position of the highest point P23 in the advance direction to the landing point P21 and separate from the highest point P23 by the same distance as a distance L2 to the landing point P21 in the advance direction, and the distance L2 in the advance direction is doubled to set the advance travel distance D. Further, the height of the highest point P23 with reference to the upward/downward position of the landing point P21 is set to be the upward/downward travel distance H. Instead, a length equal to one-half the upward/downward amplitude of the side-view position changing from a previous landing point (not shown) to the current landing point P21 may be determined and set to be the upward/downward travel distance H, as in the first calculation method. The propulsion efficiency angle θ is then calculated at the landing point P21 in accordance with Expression (2), which is used in the first calculation method.

Returning to FIG. 20, the storage unit 490 is achieved by any of a variety of IC (integrated circuit) memories, such as a ROM (read only memory), a flash ROM, and a RAM (random access memory), and a storage medium, such as a hard disk drive. The storage unit 490 stores in advance a program for achieving the variety of functions of the running motion evaluation apparatus 4, data used when the program is executed, and other types of information or temporarily stores them whenever a process is carried out.

Figure 24:
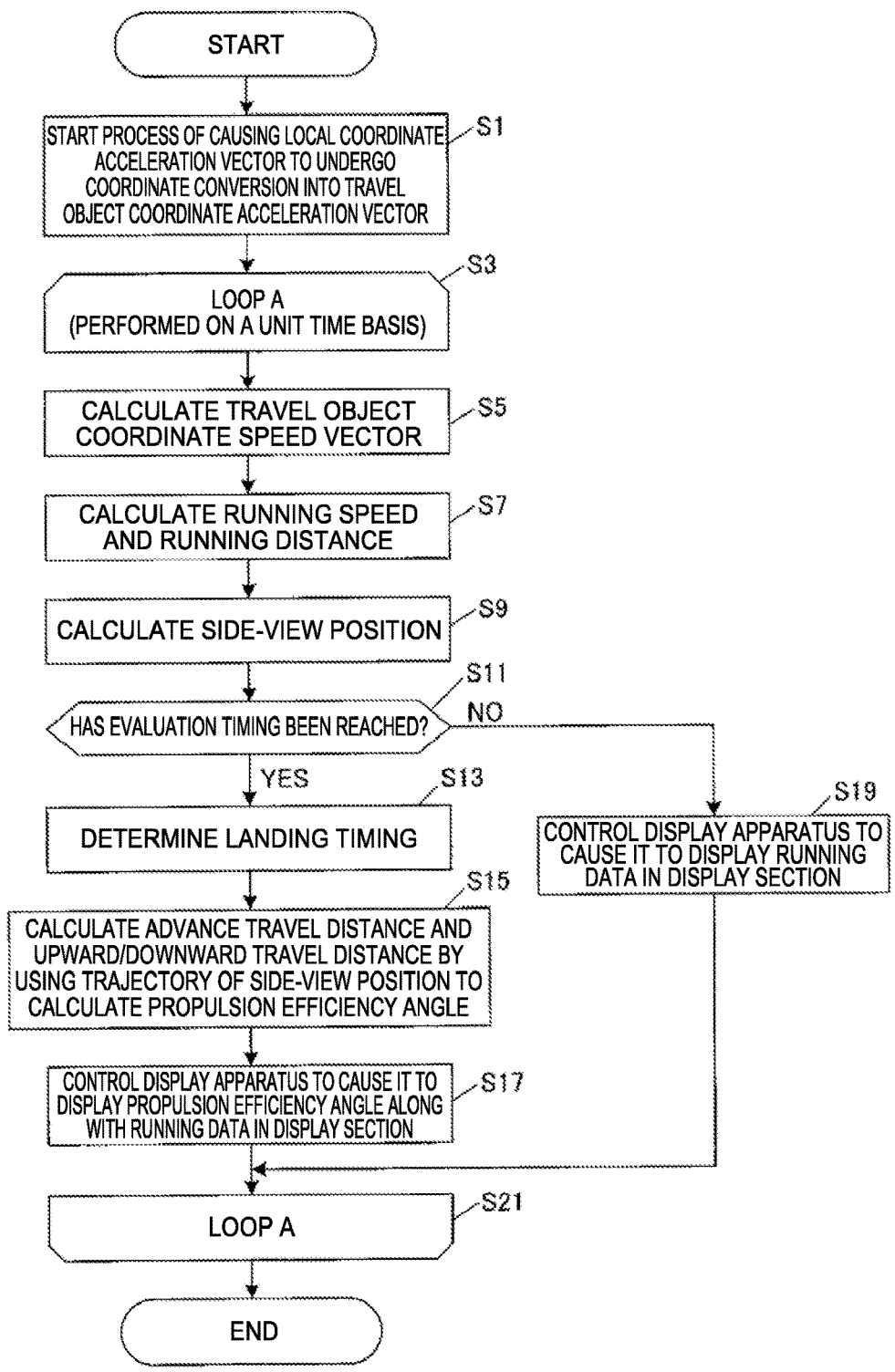
FIG. 24 is a flowchart showing the procedure of a running motion evaluation process in the first example of the third embodiment.

The storage unit 490 stores a running motion evaluation program 491, which causes the processing unit 480 to function as the coordinate conversion section 481, the travel object coordinate speed vector calculation section 482, the running data calculation section 483, the side-view position detection section 484, the landing timing determination section 485, and the propulsion efficiency angle calculation section 486 to carry out a running motion evaluation process (see FIG. 24).

The storage unit 490 further stores travel object coordinate acceleration vector data 492, travel object coordinate speed vector data 493, landing timing data 494, and running information 495.

The travel object coordinate acceleration vector data 492 chronologically stores the travel object coordinate acceleration vector calculated by the coordinate conversion section 481 on a unit time basis. The travel object coordinate acceleration vector data 492 is formed, for example, of a ring buffer that holds travel object coordinate acceleration vectors corresponding to the latest past predetermined seconds. In the first example, the in-air duration in which legs are separated from the ground is determined as the evaluation timing, and the landing timing immediately before is determined whenever the evaluation timing is reached. Therefore, when a ring buffer is used, the ring buffer is configured to have memory capacity considered to be equivalent, for example, to a one-footstep period so that at least travel object coordinate acceleration vectors calculated after the previous evaluation timing are held without fail.

The travel object coordinate speed vector data 493 chronologically stores the travel object coordinate speed vector calculated by the travel object coordinate speed vector calculation section 482 on a unit time basis. The travel object coordinate speed vector data 493 is formed, for example, of a ring buffer that holds travel object coordinate speed vectors corresponding to the latest past predetermined seconds, as the travel object coordinate acceleration vector data 492 is.

The landing timing data 494 chronologically stores the landing timing determined by the landing timing evaluation section 485.

The running information 495 chronologically stores the running speed and the running distance of the user 1 calculated by the running data calculation section 483 on a unit time basis, the side-view position of the user 1 with reference to in the running start position detected by the side-view position detection section 484 as a base point on a unit time basis, and the propulsion efficiency angle calculated by the propulsion efficiency angle calculation section 486 on a predetermined evaluation timing basis. FIG. 23 shows an example of the data configuration of the running information 495. The running information 495 is a data table in which the running data formed of the running speed and the running distance and the propulsion efficiency angle are set, related to the side-view position (X, Y), as shown in FIG. 23. Each record is generated on a unit time basis, and an actual value of the propulsion efficiency angle is set only in a record generated when it is determined that the evaluation timing is reached and the propulsion efficiency angle is calculated along with the running data. Each record may be related to temporal information, such as a system clock, and then stored.

Process Flow

FIG. 24 is a flowchart showing the procedure of the running motion evaluation process in the first example. The process described below can be achieved by causing the processing unit 480 to read the running motion evaluation program 491 from the storage unit 490 and execute the read running motion evaluation program 491.

The running motion evaluation process starts, for example, when running start operation is performed via the operation unit 410. First, the coordinate conversion section 481 causes the local coordinate acceleration vector to undergo coordinate conversion into the travel object coordinate acceleration vector based on measurement results from the IMU 33 and accumulates and stores the converted travel object coordinate acceleration vector in the travel object coordinate acceleration vector data 492 (step S1), as shown in FIG. 24. Thereafter, the processes in a loop A are repeatedly carried out on a unit time basis until running end operation is performed (step S3 to step S21).

In the loop A, the travel object coordinate speed vector calculation section 482 first integrates travel object coordinate acceleration vectors corresponding to unit time since the processes in the loop A were previously carried out to calculate a travel object coordinate acceleration vector (step S5). The running data calculation section 483 then calculates the current running speed and running distance of the user 1 in accordance with the travel object coordinate acceleration vector calculated in step S5 (step S7).

The side-view position detection section 484 detects the current side-view position of the user 1 in accordance with a change in the speed vector that occurs in the course of the calculation of the travel object coordinate speed vector in step S5 and corresponds to unit time (step S9).

The processing unit 480 subsequently determines whether or not the evaluation timing has been reached (step S11). The upward/downward acceleration of the user 1 who is running greatly changes by landing action and kicking action when a leg is in contact with the ground, whereas transitioning but maintained at a value close to a predetermined value ("0", for example) during an in-air duration, in which legs are separate from the ground. In step S7, an in-air duration is detected based on the upward/downward acceleration contained in the travel object coordinate acceleration vector (Z-axis component of travel object coordinate acceleration vector), and the detected in-air duration is determined to be the evaluation timing. For example, the processing unit 480 determines, based on a change in the upward/downward acceleration that occurs in the period from the previously determined evaluation timing to the current time, that the evaluation timing has been reached when a large amount of change in the upward/downward acceleration is followed by transition of the current upward/downward acceleration within a predetermined amount of change around upward/downward acceleration close to "0" (step S11: YES).

At the evaluation timing, the landing timing determination section 485 sets a target period from the previous landing timing to the current time and determines the nearest landing timing based on a change in the advance acceleration in the target period (step S13).

The propulsion efficiency angle calculation section 486 subsequently applies the first or second calculation method described above to calculate the advance travel distance D and the upward/downward travel distance H resulting from the landing action and the kicking action of the user 1 and calculates the propulsion efficiency angle θ from Expression (2) described above (step S15).

The processing unit 480 then controls the display apparatus 5 to cause it to display the propulsion efficiency angle calculated in step S15 along with the running data calculated in step S7 in the display section 53 (step S17). When a determination result in step S11 shows that no evaluation timing has been reached (step S11: NO), the processing unit 480 controls the display apparatus 5 to cause it to display the running data calculated in step S7 in the display section 53 (step S19). The display process is carried out by transmitting the propulsion efficiency angle and the running data in step S17 but the running data in step S19 via the communication unit 450 to the display apparatus 5 and causing the display apparatus 5 having received the propulsion efficiency angle and the running data to display them in the display section 53. How to display the propulsion efficiency angle and the running data is not limited to a specific way, and the latest values may be displayed, or time-course changes since the running started may be displayed. The processes in a single loop A are completed as described above.

As described above, according to the first example, the jump direction with respect to the advance direction in the kicking action can be estimated in consideration of movement of the user 1 in the advance direction and movement of the user 1 in the upward/downward direction resulting from a pair of landing action and kicking action, and the propulsion efficiency angle can then be calculated. An index that reflects well the propulsion efficiency can therefore be provided. Further, in this process, no kicking point needs to be determined. The user 1 can therefore run while making use of the propulsion efficiency angle for improvement in the running form or otherwise being aware of the user's own motion state.

Second Example

A second example of the third embodiment will next be described. The same portions as those in the first example have the same reference characters.

Figure 25:
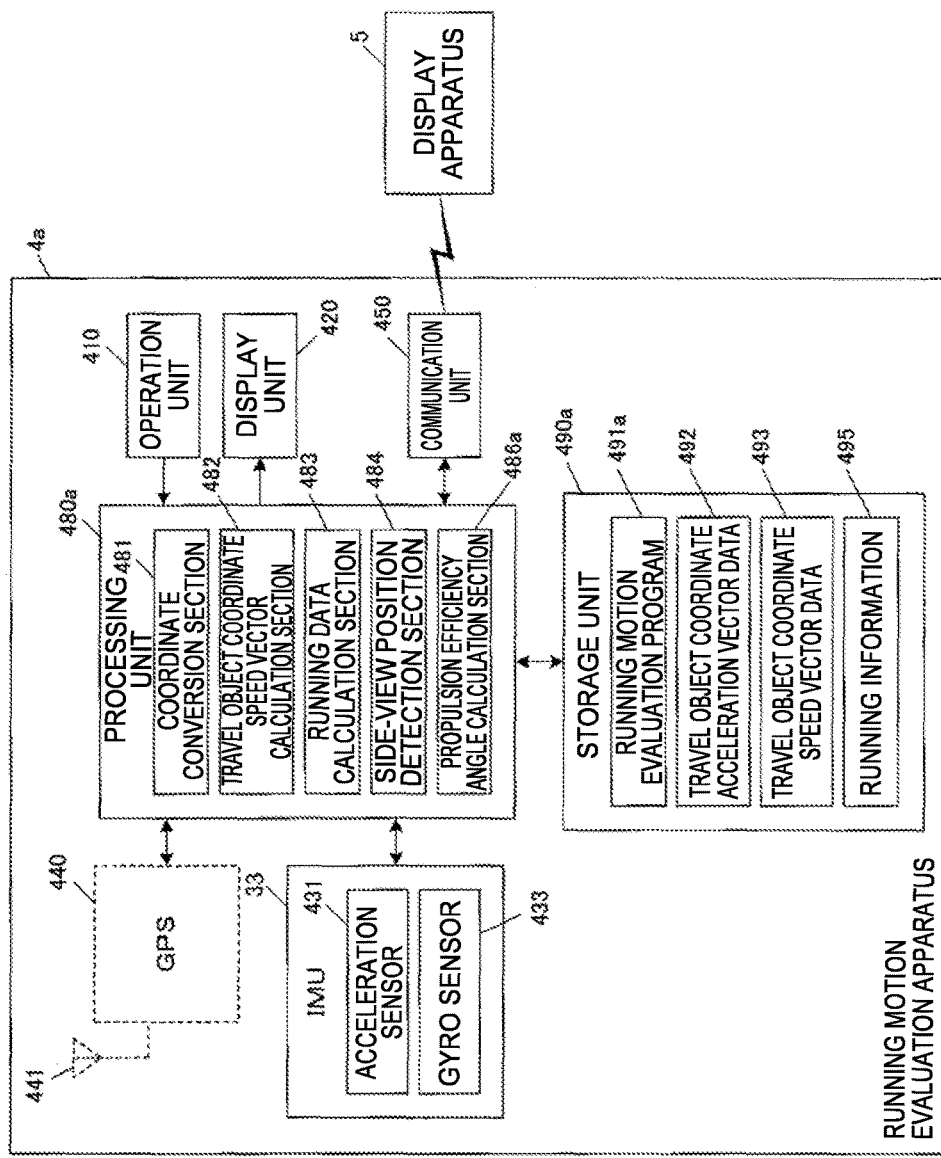
FIG. 25 is a block diagram showing an example of the functional configuration of a running motion evaluation apparatus in a second example of the third embodiment.

FIG. 25 is a block diagram showing an example of the functional configuration of a running motion evaluation apparatus 4a in the second example of the third embodiment. The running motion evaluation apparatus 4a includes the operation unit 410, the display unit 420, the IMU 33, the GPS module 440, the communication unit 450, a processing unit 480a, and a storage unit 490a, as shown in FIG. 25.

The processing unit 480a includes the coordinate conversion section 481, the travel object coordinate speed vector calculation section 482, the running data calculation section 483, the side-view position detection section 484, and a propulsion efficiency angle calculation section 486a.

In the second example, the propulsion efficiency angle calculation section 486a determines the evaluation timing in a target period from previous evaluation timing to the current time and calculates the propulsion efficiency angle by using the trajectory of the side-view position in the target period whenever evaluation timing is reached. For example, the trajectory of the side-view position in the target period is approximated, for example, by spline interpolation, and local extremes are detected from the approximate curve. When the nearest local extreme traced back from the current time is a local maximum, it is determined that evaluation timing has been reached, and the propulsion efficiency angle is calculated. Two calculation methods are presented below by way of example as a method for calculating the propulsion efficiency angle in the second example.

Third Calculation Method

Figure 26:
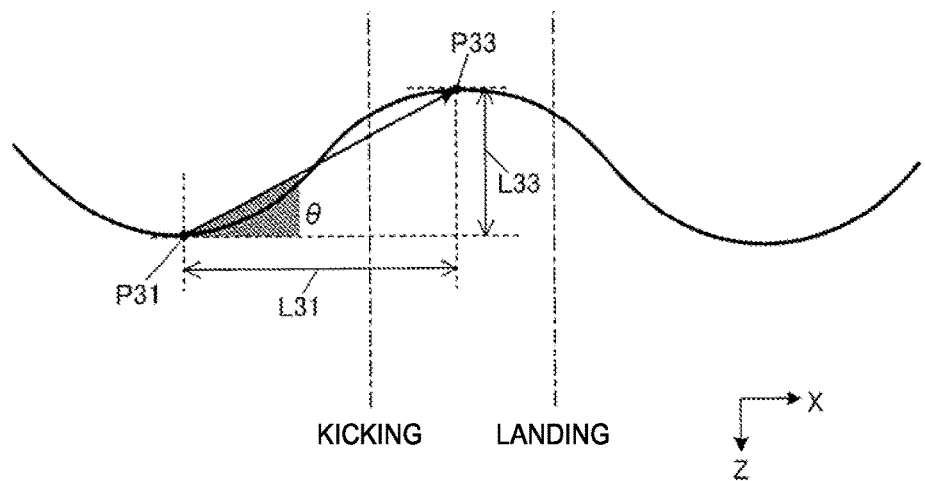
FIG. 26 describes the principle of a third calculation method in accordance with which the propulsion efficiency angle is calculated.

FIG. 26 describes the principle of a third calculation method in accordance with which the propulsion efficiency angle is calculated. FIG. 26 shows an example of the trajectory of the side-view position along with actual landing timing and kicking timing with the horizontal direction being the advance direction and the vertical direction being the upward/downward direction. In the third calculation method, neither the landing timing nor the kicking timing is determined.

In the third calculation method, the propulsion efficiency angle θ is calculated in the form of an angle with respect to the advance direction of a vector oriented from a lowest point P31 in the upward/downward direction resulting from subduction after the user 1 lands on the ground (local minimum determined from trajectory of side-view position) to a highest point P33 reached by the user who jumps in the kicking action (local maximum determined from trajectory of side-view position).

In an actual process, when it is determined that evaluation timing has been reached, the time when a nearest local maximum is detected is determined to be highest point reaching timing, and the time when a local minimum immediately before the nearest local maximum is detected is determined to be lowest point reaching timing. An advance distance L31 between the highest point reaching timing and the lowest point reaching timing (between local extremes P31 and P33) is determined and set to be an advance travel distance δX. Further, an upward/downward distance L33 between the local extremes P31 and P33 is determined and set to be an upward/downward travel distance δZ.

The propulsion efficiency angle θ is then calculated in accordance with the following Expression (3):

$$\theta = \operatorname{atan}\left(\frac{\delta Z}{\delta Y}\right) \quad (3)$$

The thus calculated propulsion efficiency angle θ does not represent the angle itself in actual kicking action. However, since the advance travel distance δX and the upward/downward travel distance δZ in the range between the local extremes P31 and P33 can be determined, and each of the distances δX and δZ can be a large value so that variation in the propulsion efficiency angle θ is suppressed, a probable value can be provided as the propulsion efficiency index value.

Fourth Calculation Method

Figure 27:
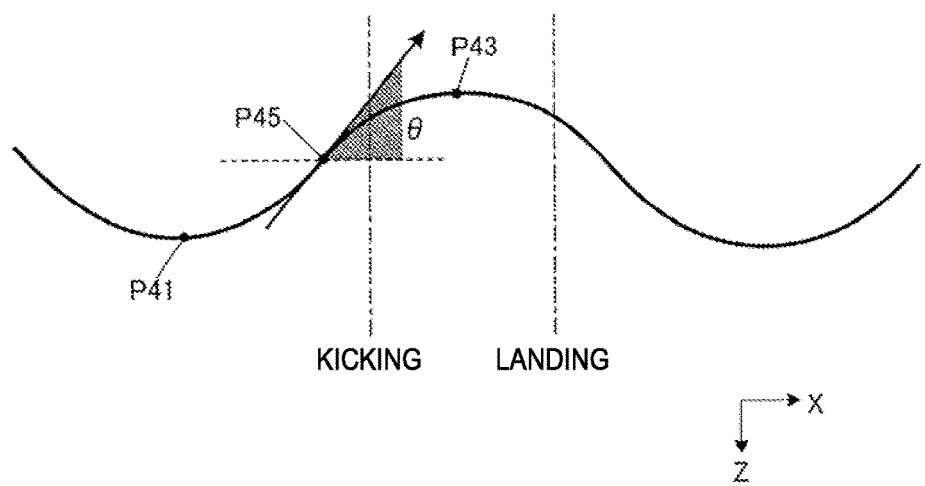
FIG. 27 describes the principle of a fourth calculation method in accordance with which the propulsion efficiency angle is calculated.

FIG. 27 describes the principle of a fourth calculation method in accordance with which the propulsion efficiency angle is calculated. FIG. 27 shows an example of the trajectory of the side-view position along with actual landing timing and kicking timing with the horizontal direction being the advance direction and the vertical direction being the upward/downward direction. In the fourth calculation method, neither the landing timing nor the kicking timing is detected, as in the third calculation method.

In the fourth calculation method, an inflection point between a lowest point in the upward/downward direction (local minimum determined from trajectory of side-view position) P41 and a highest point (local maximum determined from trajectory of side-view position) P43 is determined. The propulsion efficiency angle θ is then calculated in the form of an angle with respect to the advance direction of a tangent of an approximate curve at the inflection point P45. The inflection point P45 does not necessarily coincide with an actual kicking point but can be considered to be a point where the user 1 exerts force that allows the user to jump in order to greatly change the moving direction of the body. The angle between the tangential direction and the advance direction at the inflection point P45 reflects well the propulsion efficiency.

In an actual process, for example, an inflection point between the local extremes P41 and P43 is detected from an approximate curve determined to detect the local extremes P41 and P43. An advance distance from the determined inflection point P45 to a side-view position immediately after the inflection point P45 is set to be the advance travel distance δX, and the upward/downward distance from the inflection point P45 to the side-view position is set to be the upward/downward travel distance δZ. The propulsion efficiency angle θ is then calculated in accordance with Expression (3) described above and used in the third calculation method.

Returning to FIG. 25, the storage unit 490*a* stores a running motion evaluation program 491*a*, the travel object coordinate acceleration vector data 492, the travel object coordinate speed vector data 493, and the running information 495.

Process Flow

Figure 28:
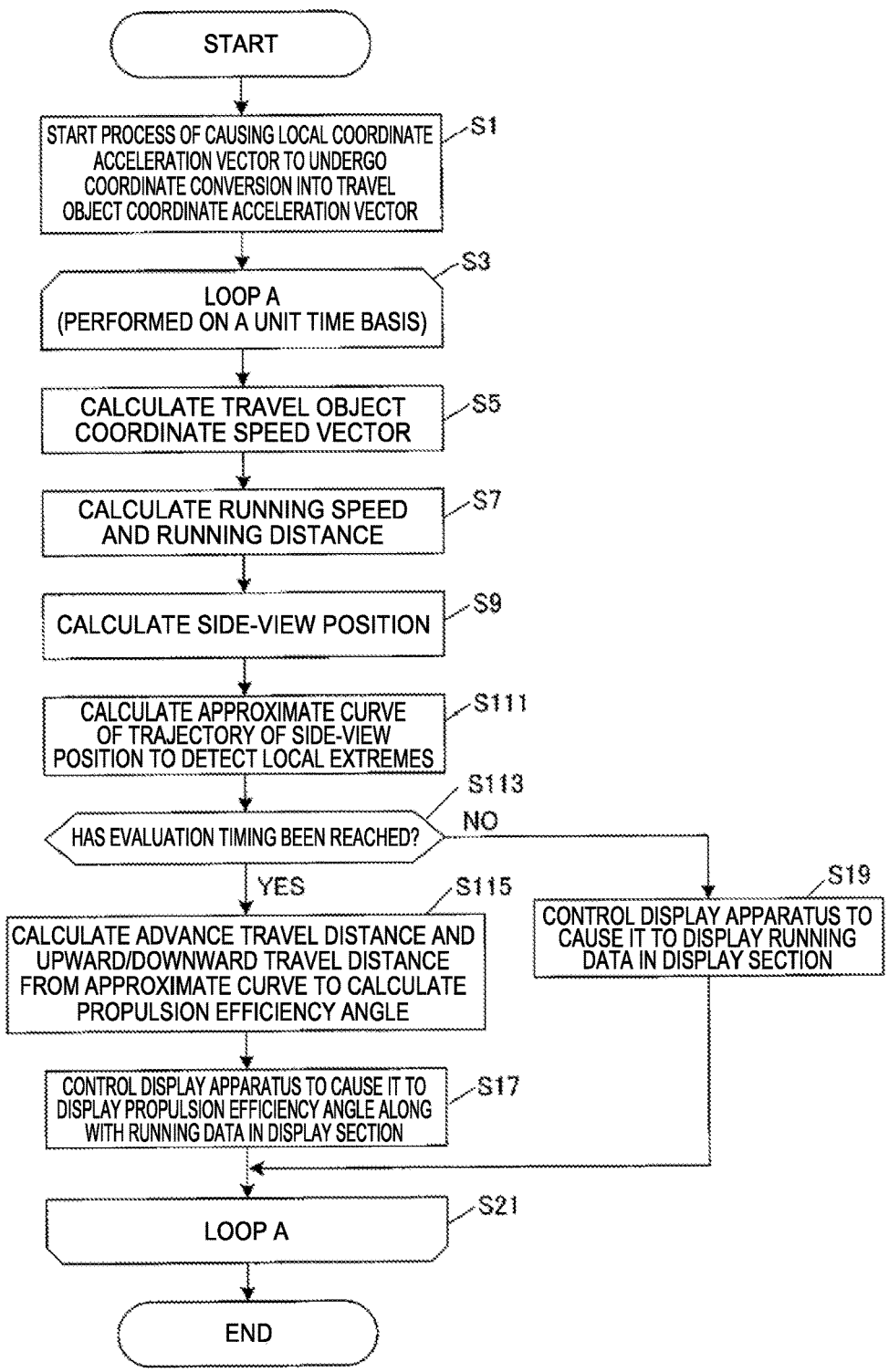
FIG. 28 is a flowchart showing the procedure of a running motion evaluation process in the second example of the third embodiment.

FIG. 28 is a flowchart showing the procedure of the running motion evaluation process in the second example. In the running motion evaluation process in the second example, after step S9, the propulsion efficiency angle calculation section 486*a* sets the period from previous evaluation timing to the current time to be a target period, calculates an approximate curve of the trajectory of the side-view position in the target period, and detects a local extreme (step S111). The propulsion efficiency angle calculation section 486*a* then determines that evaluation timing has been reached when a local extreme nearest to the current time is a local maximum (step S113: YES).

When evaluation timing has been reached, the propulsion efficiency angle calculation section 486*a* applies the third or fourth calculation method described above to calculate the advance travel distance δX and the upward/downward travel distance δZ resulting from the landing action and the kicking action of the user 1 and calculates the propulsion efficiency angle θ from Expression (3) described above (step S115). The control then proceeds to step S17.

As described above, according to the second example, the trajectory of the side-view position of the user 1 can be used to calculate the propulsion efficiency angle in consideration of movement of the user 1 in the advance direction and movement of the user 1 in the upward/downward direction resulting from a pair of landing action and kicking action.

Figure 29:
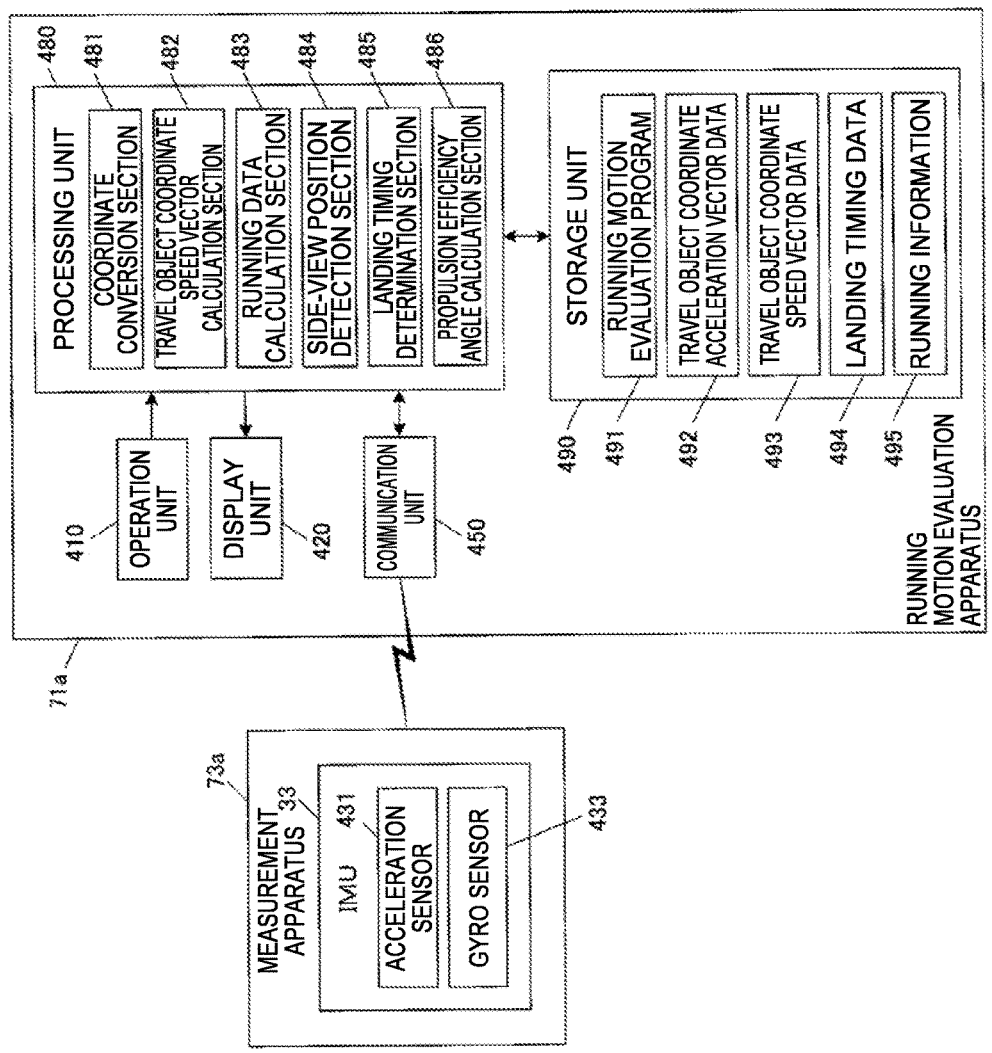
FIG. 29 is a block diagram showing an example of the functional configuration of a running motion evaluation apparatus in a variation of the third embodiment.

The configuration of the running motion evaluation system described in the above third embodiment is presented by way of example and may be changed as appropriate. FIG. 29 is a block diagram showing an example of the configuration of a running motion evaluation system in a variation of the third embodiment. In FIG. 29, the same portions as those in the first example have the same reference characters.

The running motion evaluation system according to the present variation is formed of a running motion evaluation apparatus 71*a* and a measurement apparatus 73*a* with the running motion evaluation apparatus 71*a* attached to an arm (right arm or left arm) of the user 1 and the measurement apparatus 73*a*, which is an apparatus separate from the running motion evaluation apparatus 71*a*, attached to a body portion (right waist or left waist, for example) of the user 1 when used.

The measurement apparatus 73*a* accommodates the IMU 33, which includes the acceleration sensor 431 and the gyro sensor 433. The measurement apparatus 73*a* is configured to be capable of transmitting and receiving data to and from the running motion evaluation apparatus 71*a* over wireless communication and transmits measurement results from the IMU 33 to the running motion evaluation apparatus 71*a* whenever necessary.

On the other hand, the running motion evaluation apparatus 71*a* includes the operation unit 410, the display unit 420, the communication unit 450, the processing unit 480, and the storage unit 490. The processing unit 480 includes the coordinate conversion section 481, the travel object coordinate speed vector calculation section 482, the running data calculation section 483, the side-view position detection section 484, the landing timing determination section 485, and the propulsion efficiency angle calculation section 486, as, for example, in the running motion evaluation apparatus 4 in the first example. The storage unit 490 stores the running motion evaluation program 491, the travel object coordinate acceleration vector data 492, the travel object coordinate speed vector data 493, the landing timing data 494, and the running information 495, as in the running motion evaluation apparatus 4 in the first example. The processing unit 480 may instead have the configuration of the processing unit 480*a* in the second example, and storage unit 490 may instead have the configuration of the storage unit 490*a* in the second example.

Further, in the third embodiment described above, the running speed and the running distance of the user 1 are calculated as the running data whenever necessary and displayed in the display section 53. Further, the position of the user 1 may be calculated as the running data and displayed in the display section 53. For example, inertial navigation may be used to autonomously measure the position of the user 1, which may be displayed as the running data. In this case, measurement results from the IMU 33 are used to carry out a known inertial navigation computation process to calculate the position of the user 1 whenever necessary in an absolute coordinate system defined, for example, as the ECEF (earth center earth fixed) coordinate system. Instead, when the running motion evaluation apparatus 4 or any other running motion evaluation apparatus includes the GPS module 440 indicated with the broken line in FIG. 20, a measurement result from the GPS module 440 may be used as the position of the user 1 and displayed as part of the running data.

The above first example has been described with reference to the case where the landing timing is determined and the landing timing is used to calculate the propulsion efficiency angle, which is the propulsion efficiency index value. Instead, the takeoff timing may be determined, and the takeoff timing may be used to calculate the propulsion efficiency angle, which is the propulsion efficiency index value.

Specifically, the running motion evaluation apparatus 4 in FIG. 20 is further provided with a takeoff timing determination section. The takeoff timing determination section, for example, determines takeoff timing by using the upward/downward acceleration or the side-view position of the user 1. The propulsion efficiency angle calculation section 486 then calculates the propulsion efficiency angle in the form of the orientation of the propulsion relative to the advance direction at the takeoff timing. For example, the propulsion efficiency angle is calculated based on the distance from the takeoff timing to highest point reaching timing immediately after the takeoff timing and the height of the highest point reaching timing. The propulsion efficiency angle may instead be calculated in the form of an angle of elevation with respect to the advance direction of the travel object coordinate acceleration vector at the takeoff timing.

The entire disclosure of Japanese Patent Application No. 2014-156116, filed Jul. 31, 2014 and No. 2014-155884, filed Jul. 31, 2014 and No. 2014-155883, filed Jul. 31, 2014 and No. 2015-115210, filed Jun. 5, 2015 are expressly incorporated by reference herein.

What is claimed is:

1. An on-running landing position evaluation method comprising:
   with an acceleration sensor, evaluating a running motion of a user who is running by determining deceleration periods in on-ground durations of the running motion of the user based on acceleration values from the acceleration sensor;
   calculating travel distances in the determined deceleration periods corresponding to distances between landing positions of the user and centers of gravity of the user when the user lands in the running motion; and displaying a histogram during the running motion, wherein a first axis of the histogram indicates a plurality of different travel distances and a second axis of the histogram indicates frequencies that each of the plurality of different travel distances were calculated as travel distances, and wherein the histogram includes an indication of which of the plurality of different travel distances corresponds to a most recently calculated travel distance.

2. The on-running landing position evaluation method according to claim 1, wherein determining the deceleration periods includes determining landing timings of the running motion of the user and standing intermediate point timings of the running motion of the user when the centers of gravity of the user are above the landing positions.

3. The on-running landing position evaluation method according to claim 2, wherein determining the standing intermediate point timings include using the acceleration values from the acceleration sensor in a vertical direction.

4. The on-running landing position evaluation method according to claim 1, wherein calculating the travel distances includes multiplying durations of the deceleration periods by travel speeds of the user determined from the acceleration sensor.

5. The on-running landing position evaluation method according to claim 2, comprising:

detecting positions of the landing timings and the standing intermediate point timings; and calculating the travel distances based on positions of the landing timings and the standing intermediate point timings.

* * * * *